United States Patent
McSheery et al.

(10) Patent No.: US 6,324,296 B1
(45) Date of Patent: Nov. 27, 2001

(54) DISTRIBUTED-PROCESSING MOTION TRACKING SYSTEM FOR TRACKING INDIVIDUALLY MODULATED LIGHT POINTS

(75) Inventors: Tracy D. McSheery, San Mateo; John R. Black, Davis; Scott R. Nollet, Riverside; Jack L. Johnson, San Diego; Vinay C. Jivan, Milpitas, all of CA (US)

(73) Assignee: Phasespace, Inc., Pleasant Hills, CA (US)

( * ) Notice: Subject to any disclaimer, the term of this patent is extended or adjusted under 35 U.S.C. 154(b) by 0 days.

(21) Appl. No.: 08/985,354

(22) Filed: Dec. 4, 1997

(51) Int. Cl.[7] .............................. G06T 7/20; G06T 7/60; G06K 9/00; G01C 3/00
(52) U.S. Cl. .................. 382/107; 382/103; 382/106; 382/154; 382/291; 382/304; 250/203.3; 250/559.32; 356/620; 356/623; 702/152
(58) Field of Search ..................... 382/103, 106, 382/107, 118, 153, 154, 288, 291, 304, 323; 345/358; 356/3.14, 3.15, 375, 139.03, 152.1, 620, 623; 250/203.2, 203.3, 559.32, 559.35, 206.2, 206.3; 901/47; 348/77, 119, 139, 169, 172; 341/56; 702/142, 152, 153, 172

(56) References Cited

U.S. PATENT DOCUMENTS

| | | | |
|---|---|---|---|
| Re. 35,816 | * 6/1998 | Schultz | 356/376 |
| 3,564,257 | 2/1971 | Berry | 250/203 |
| 3,918,814 | 11/1975 | Weiser | 356/156 |
| 4,039,825 | 8/1977 | Doyle | 250/203 R |
| 4,121,294 | * 10/1978 | Galanis et al. | 364/571 |
| 4,146,924 | 3/1979 | Birk et al. | 364/513 |
| 4,193,689 | 3/1980 | Reymond et al. | 356/152 |
| 4,315,690 | 2/1982 | Trocellier et al. | 356/152 |
| 4,396,945 | * 8/1983 | DiMatteo et al. | 358/107 |
| 4,410,878 | * 10/1983 | Stach | 340/347 |

(List continued on next page.)

OTHER PUBLICATIONS

Dyer et al., Motion Capture White Paper, Dec. 12, 1995.
"Acclaim Entertainment, Inc." product literature.

(List continued on next page.)

Primary Examiner—Leo Boudreau
Assistant Examiner—Brian P. Werner

(57) ABSTRACT

Disclosed is a distributed-processing motion capture system (and inherent method) comprising: plural light point devices, e.g., infrared LEDs, in a motion capture environment, each providing a unique sequence of light pulses representing a unique identity (ID) of a light point device; a first imaging device for imaging light along a first and second axis; and a second imaging device for imaging light along a third and fourth axis. Both of the imaging devices filter out information not corresponding to the light point devices, and output one-dimensional information that includes the ID of a light point device and a position of the light point device along one of the respective axes. The system also includes a processing device for triangulating three-dimensional positions of the light point devices based upon the one-dimensional information. The system is very fast because the necessary processing is distributed to be maximally parallel. The motion capture system uses a cylindrical collimating (CC) optics sub-system superimposed on a cylindrical telecentric (CT) optics sub-system. The outputs of the plural light point devices are modulated to provide a unique sequence of light pulses representing a unique identifier (ID) for each of the light point devices according to a predetermined cycle of modulation intervals based upon synchronization signals provided via RF communication. At least two of the light point devices concurrently provide light during the cycle.

50 Claims, 28 Drawing Sheets

U.S. PATENT DOCUMENTS

| | | | |
|---|---|---|---|
| 4,636,080 | | 1/1987 | Feldman .............................. 356/401 |
| 4,691,446 | | 9/1987 | Pitches et al. ......................... 33/516 |
| 4,788,440 | * | 11/1988 | Pryor .................................... 250/561 |
| 4,808,064 | * | 2/1989 | Bartholet .............................. 414/730 |
| 4,836,778 | * | 6/1989 | Baumrind et al. ..................... 433/69 |
| 4,973,156 | * | 11/1990 | Dainis .................................. 356/141 |
| 5,095,386 | | 3/1992 | Scheibengraber .................... 359/668 |
| 5,257,125 | | 10/1993 | Maeda ................................. 359/196 |
| 5,393,970 | * | 2/1995 | Shau et al. ........................ 250/206.2 |
| 5,490,075 | * | 2/1996 | Howard et al. ...................... 364/459 |
| 5,522,785 | * | 6/1996 | Kedl et al. ............................. 492/21 |
| 5,585,856 | * | 12/1996 | Nakaya et al. ....................... 348/441 |
| 5,793,630 | * | 8/1998 | Theimer et al. ................ 364/140.01 |
| 5,828,770 | * | 10/1998 | Leis et al. ............................. 382/103 |
| 5,856,844 | * | 1/1999 | Batterman et al. .................. 348/207 |
| 5,901,236 | * | 5/1999 | Mizui .................................. 382/104 |

OTHER PUBLICATIONS

"Meeting Evolving VR Needs[,] Ascension's Family of Motion Tracking Devices", Jack Scully, Ascension Technology Corporation, Product Literature.

"The Dream Machine", Steven Aukstakalnis, *Virtual Reality News*, Jul.–Aug. 1993, p. 16.

"Performance Capture for Film, Video and Game Production", Dean LaCoe, Motion Analysis Corporation, Production Literature.

"OPTOTRAK by Northern Digital, Inc." brochure, Oct. 1, 1993.

"Pholhemus Inc." product literature.

"A Testbed for Characterizing Dynamic Response of Virtual Environment Spatial Sensors", Adelstein et al., *UIST '92 of the* ACM, Nov. 15–18, 1992, pp. 15–22.

Polhemus "Technical Note[,] Latency—3Space Fastrak".

"Accuracy, Resolution and Latency: VR's Most Misunderstood Terminology for Electromagnetic Tracking", James C. Kreig, *Electronic Imaging West 92*, pp. 1–8.

"Accuracy, Resolution, Latency and Speed; Key Factors in virtual Reality Tracking Environments", James C. Kreig, Polhemus Incorporated, Sep. 1992, pp. 1–11.

"A 4 Millisecond, Low Latency, 120 HZ. Electromagnetic Tacker for Virtual Reality Applications", Kreig et al. pp. 1–3.

"Science Accessories Corp. 1992 Annual Report".

Mira Imaging Inc. brochure on "Hyperspace" products.

Selspot Systems Ltd. "Robot Check" product literature.

SuperFluo Inc. product literature.

Motion Capture: It's Real, It's Time, *Animation Magazine*, Tina White and Benjamin G. Levy vol. 5, Issue 3/4 Summer 1992.

"Graphics You Can Chew On[,] Bubble gum ad uses animation to create an action–packed trip through a virtual world", John Webster *Computer Graphics World*, Jul. 1993, pp. 89–90.

"Full Steam Ahead[,] Created in a flash, Peter Gabriel's latest music video is packed with dazzling computer–generated special effects," Laureen Belleville, *Computer Graphics World*, Jun. 1993, pp. 171–172.

United Technologies Adaptive Optics Associates product literature on "Multi–Trax Systems".

* cited by examiner

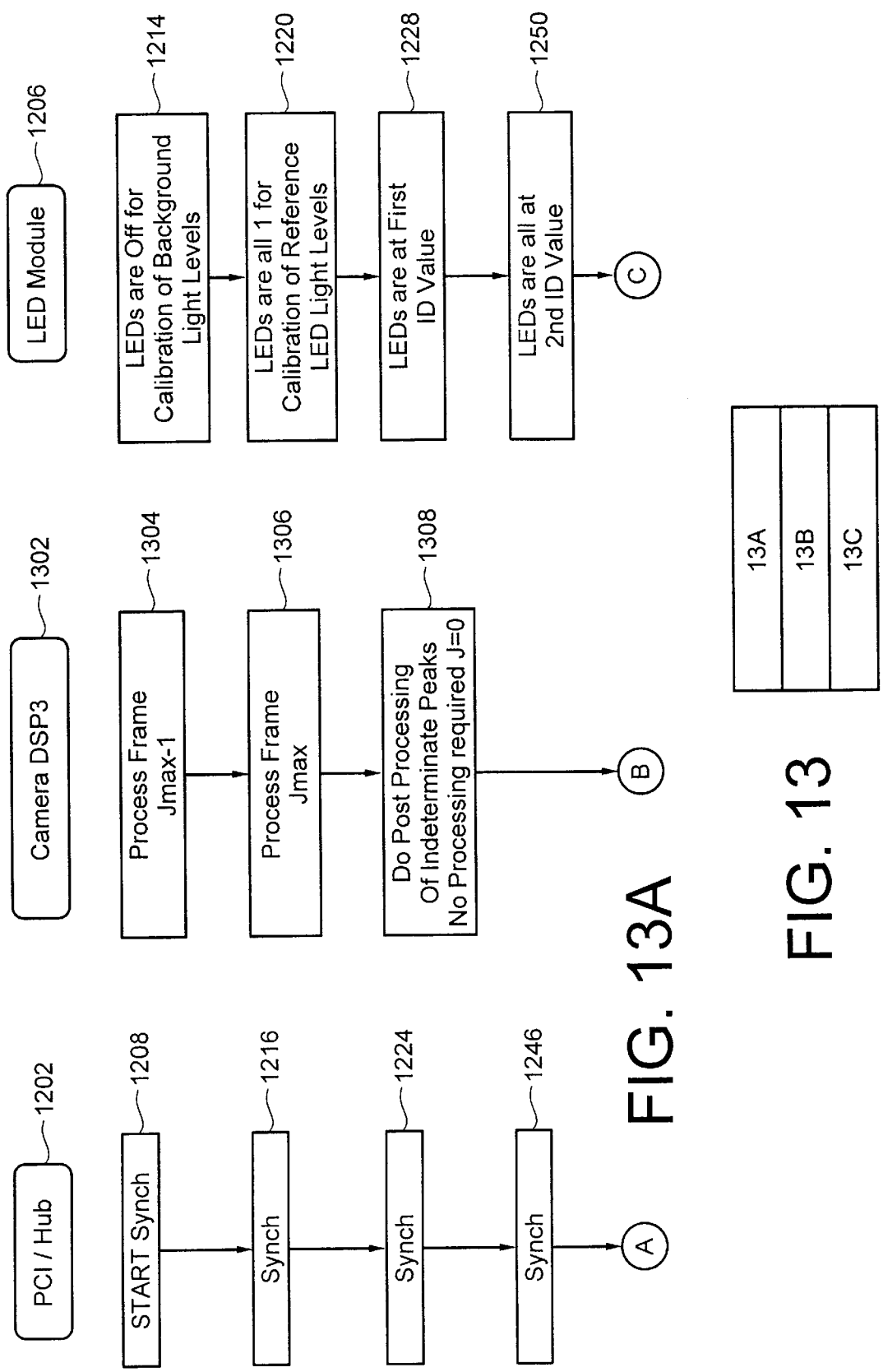

{Position, Amp}

FIG. 14A

{Axis, Positon, Amp}

FIG. 14B $M_i$ {Axis, Positon, Amp, Veloc, Accel, Jerk}

FIG. 14C

{ID, Camera, Axis, Position}

FIG. 14D

{ID, Camera, Axis, Position, Quality}

FIG. 14E

{ID, Camera, Axis, Position, Quality, Guess}

FIG. 14F

| Camera | Axis | $ID_0$ | $ID_1$ | $ID_2$ | ... | $ID_{H-1}$ |
|--------|------|--------|--------|--------|-----|------------|
| 0 | X | YES | NO | YES | ... | NO |
| 0 | Y | NO | YES | YES | ... | YES |
| 1 | X | NO | NO | YES | ... | YES |
| 1 | Y | NO | YES | NO | ... | NO |
| ⋮ | ⋮ | ⋮ | ⋮ | ⋮ | ⋮ | ⋮ |
| G-2 | X | YES | YES | NO | ... | NO |
| G-1 | Y | NO | NO | YES | ... | YES |

FIG. 19

DISTRIBUTED-PROCESSING MOTION TRACKING SYSTEM FOR TRACKING INDIVIDUALLY MODULATED LIGHT POINTS

BACKGROUND OF THE INVENTION

1. Field of the Invention

The invention is directed toward a system and method for determining the positions of plural objects over time, i.e., to capturing or tracking motion of objects. More particularly, the invention is directed toward an optical motion capture (MC) system and method.

2. Description of the Related Art

Motion capture is one of the hottest topics in computer graphics animation today. What is motion capture? Motion capture involves measuring at least one object's position and orientation in physical space, then recording that information over time in a computer-usable form. Objects of interest include human and non-human bodies, facial expressions, hand gestures, camera or light positions, and other elements in a scene.

Once data is recorded in computer-usable form, animators can use it to control elements in a computer generated scene. Such a scene can be used in a biomechanical analysis, e.g., in a reproduction of a golfer's swing for slow motion analysis from a variety of computer-generated viewing angles by an instructor. Such a scene might also form the basis of an animated sequence in a science fiction movie.

Animation which is based purely on motion capture uses the recorded positions and orientations of real objects to generate the paths taken by synthetic objects within the computer-generated scene. However, because of constraints on mismatched geometry, quality constraints of motion capture data, and creative requirements, animation rarely is purely motion capture-based.

Data from real-time motion capture devices can be used interactively (assuming minimal transport delay) to provide real-time feedback regarding the character and quality of the captured data. Non-real-time motion capture devices either provide data that requires additional post-processing before it can be used in an animation or computer graphic display or provide data that is merely a snapshot of the measured objects.

Motion capture systems reflect a balancing of a number of competing considerations, or tradeoffs. Those tradeoffs are: the number of points that can be tracked, resolution, ease of use, affordability, convenience and flexibility in terms of how readily the system can adapt to different motion capture tasks. The typical motion capture systems are either magnetically or optically based.

MAGNETIC MOTION CAPTURE SYSTEMS

Magnetic motion capture systems use sensors to accurately measure the magnetic field created by a source. Such systems are real-time, in that they can provide from 15 to 120 samples per second (depending on the model and number of sensors) of 6 degree-of-freedom data (position and orientation) with minimal transport delay.

A typical magnetic motion capture system has one or more electronic control units into which the source(s) and 10 to 20 sensors are cabled. The electronic control units are, in turn, attached to a host computer through a network or serial port. The motion capture or animation software communicates with these devices via a driver program. The sensors are attached to the scene elements being tracked. The source is set either above or to the side of the active area. There can be no metal in the active area, because it can interfere with the motion capture.

The ideal approach for magnetic motion capture is to place one sensor at each joint of a body. However, the physical limitations of the human body (the arms must connect to the shoulder, etc.) allow an exact solution with significantly fewer sensors. Because a magnetic system provides both position and orientation data, it is possible to infer joint positions by knowing the limb lengths of the motion-capture subject.

The typical magnetic motion capture session is run much like a film shoot. Careful rehearsal ensures that the performers are familiar with the constraints of the tethers and the available "active" space for capture. Rehearsal often includes the people handling the cables to ensure that their motion aligns to the motion of the performers. The script is broken down into manageable shot lengths and is often story boarded prior to motion capture. Each shot may be recorded several times, and an audio track is often used as a synchronizing element.

Because the magnetic systems provide data in real-time, the director and actors can observe the results of the motion capture both during the actual take and immediately after, with audio playback and unlimited ability to adjust the camera for a better view. This tight feedback loop makes magnetic motion capture ideally suited for situations in which the motion range is limited and direct interaction between the actor, director, and computer character is important.

ADVANTAGES OF TYPICAL MAGNETIC MOTION CAPTURE

A magnetic motion capture system has several advantages. It provides position and orientation information, and so requires fewer sampling locations and less inferred information. Distances and rotations are measured in relation to a single object, the source, so there is less device calibration. Registration with other data requires only a knowledge of the source location (and obviously the measurement accuracy). Real-time interactive display and verification of the captured data is made possible, providing a closed loop model where the actor(s), director and production staff can all participate directly in the capture session. The cost of a typical magnetic system is less than $\frac{1}{3}$ to $\frac{1}{6}$ of the cost of a typical optical system.

DISADVANTAGES OF TYPICAL MAGNETIC MOTION CAPTURE

A magnetic motion capture system has several disadvantages.

The commercially available magnetic motion capture systems are so sensitive to metal that they cannot be considered office or production environment friendly devices. Care must be taken that the stage, walls, and props for a motion capture session are non-metallic. The maximum effective range of these devices is substantially less than the maximum possible for optical systems, although for longer ranges optical system accuracy decreases linearly (or nearly so).

The subject of a magnetic system is encumbered by cables. The sensors (rather than the sources) are located on the subject(s) and are connected to control units via fairly thick cables to a human subject. The sampling rate is too low for many sports motions. For body tracking applications, magnetic systems tend to have 30 to 60 Hz effective sampling rates. A fastball pitcher's hand moves at roughly 40 meters per second, approximately a meter per sample. Also, filtering is typically used to compensate for measurement jitter, reducing the effective frequency range to 0 to 15 Hz.

OPTICAL MOTION CAPTURE SYSTEMS

Typical optical motion capture systems are based on high contrast video imaging of 20 to 32 markers which are attached to the object whose motion is being recorded. The typical passive markers are retroreflective, e.g., small spheres covered with reflective material. The typical active markers are light emitting diodes (LEDs). A typical active optical system only permits one marker at a time to provide light so as to make it trivial to identify the marker.

The markers of an optical system are typically imaged by standard or HDTV high speed, black and white digital cameras. At a mere 30 frames per second, or 30 Hz sampling rate, the typical system must process between 307200 pixels, for a 640×480 camera, and 1,024,000 for a 1280×800 camera. Some optical systems increase the frame rate, i.e., the sampling rate, by decreasing the resolution, but that is an undesirable compromise.

The number of cameras used in a typical optical system depends on the type of motion to be captured. Facial motion capture usually uses one camera, sometimes two. Full body motion capture may use four to six (or more) cameras to provide full coverage of the active area. To enhance contrast, each camera is equipped with infrared (IR) emitting LEDs and IR (pass) filters are placed over the camera lens. The cameras are attached to controller cards, typically in a PC chassis.

Depending on the system, either high-contrast (1 bit) video or the marker image centroids are recorded on the PC host during motion capture. Before motion capture begins, a calibration frame, namely a carefully measured and constructed three dimensional (3D) array of markers, is recorded. This defines the frame of reference for the motion capture session.

After a motion capture session, the recorded motion data must be post-processed or tracked. The centroids of the marker images (either computed then, or recalled from disk) are matched in images from pairs of cameras, using a triangulation approach to compute the marker positions in 3D space. Each marker's position from frame to frame is then identified. Several problems can occur in the tracking process, including marker swapping, missing or noisy data, and false reflections.

Tracking can be an interactive and time-consuming process, depending on the quality of the captured data and the fidelity required. For straightforward data, tracking can take anywhere from one to two minutes per captured second of data (at a sampling rate of 120 Hz). For complicated or noisy data, or when the tracked data is expected to be used as is, tracking time can climb to 15 to 30 minutes per captured second, even with expert users. First-time users of tracking software can encounter even higher tracking times.

For a human body (excluding the face), typical setup involves 20 to 32 markers glued (preferably) to the subject's skin or to snug fitting clothing. Markers range from 1 to 5 cm in diameter, depending on the motion capture hardware and the size of the active area. Marker placement depends on the data desired. A single marker is attached at each point of interest, such as the hips, elbow, knees, feet, etc.

A simple configuration would attach three markers to the subject's head on a hat or skull cap, one marker at the base of the neck and the base of the spine, a marker on each of the shoulders, elbows, wrists, hands, hips, knees, ankles and feet, a total of 21 markers. However, if detailed rotational information, such as ulnar roll (the rotation of the wrist relative to the forearm and elbow), is desired, additional markers may be needed. To measure ulnar roll, one approach is to replace the single marker on the wrist with two markers attached as a dumbbell to the wrist.

ADVANTAGES OF TYPICAL OPTICAL MOTION CAPTURE

An optical motion capture system has several advantages. Depending on the system used and the precision required, the motion capture volume can be much larger than for a typical magnetic system. The subject is unencumbered, i.e., not physically attached to the motion capture system. This allows for the long in-run paths (for the subject to get up to speed) and long out-run paths (for the subject to slow down) required for full-speed running motion.

The sampling rate of typical optical systems is fast enough for most sports motions. At a typical sampling rate of 120 to 250 Hz, most human motions are easily measured. However, two classes of motions, pitching (hitting or throwing) and impact, are on the fringes of this sampling range. When throwing a 90 m.p.h. fastball, the human hand travels 33 cm in $\frac{1}{120}$ second. For impact events such as drumming, hitting, and hard falling, accelerations may have frequency components well beyond 120 Hz. Thankfully, these motions are a blur for human observers and the loss of accuracy is usually imperceptible.

DISADVANTAGES OF TYPICAL OPTICAL MOTION CAPTURE

An optical motion capture system has several disadvantages. It is three to six times the cost of a typical magnetic system. The costs to operate are also higher, being more similar to film or video production. Current optical systems are contrast based. As such, backgrounds, clothing, and ambient illumination may all present sources of non-negligible noise. Wet or shiny surfaces (mirrors, floors, jewelry, and so on) can cause false marker readings.

In a typical optical system, a marker must be seen by at least two cameras (for 3D data), thus total or partial occlusion caused by the subject, props, floor mats, or other markers, can result in lost, noisy, displaced, or swapped markers. Common occlusions are hand versus hip (standing), elbow versus hip (crouched) or hand versus prop in hand or opposite hand.

Tracking time (required to convert the captured video or centroid information into 3D position data, typically involving filtering and/or data repair) for a typical optical system can be much greater than the time elapsed for the corresponding capture session and may vary unpredictably, depending on accuracy requirements, motion difficulty, and the quality of the raw data captured. Because there is no immediate feedback regarding the quality and character of captured data, it is impossible to know if a given motion has been adequately captured. As such, two to three acceptable takes must be completed to ensure a reasonable probability of success if additional capture sessions are not feasible to acquire missed data.

A typical optical system provides position data only. Joint angles must be inferred by the rays connecting the joint attached markers. Recent developments in tracking software allow the creation of rotational data within the tracking process, removing the position-only restriction from optical data. However, this does add complexity to the tracking process.

A typical optical system is sensitive to calibration. Because multiple cameras are used, the frame of reference for each camera must be accurately measured. If a camera is misaligned (due to partial marker occlusion, or a simple bump of the tripod, i.e., camera mount), markers measured by that camera will be placed inconsistently in 3D space relative to markers measured by other cameras. This is particularly troubling at hand-off, namely the time at which a marker is passed from one camera's field of view into another's, as duplicate points may be created from the same marker or the marker path may jump.

OBJECTS OF THE INVENTION

It is an object of the invention to provide a motion capture (MC) system having all of the advantages of the typical magnetic and optical systems without the typical disadvantages of such systems.

It is an object of the invention to provide a MC system that operates in real time, is relatively inexpensive, is insensitive to metal in the room, has a high sampling rate, does not encumber the subject and can support a large capture volume.

SUMMARY OF THE INVENTION

The objects of the present invention are fulfilled by providing a distributed-processing motion capture system (and method inherent therein) comprising: a plurality of light point devices, e.g., infrared LEDs, in a motion capture environment, each being operable to provide a unique sequence of light pulses representing a unique identity (ID) of a light point device; first imaging means for imaging light in the motion capture environment along a first reference axis and a second reference axis oriented at a first predetermined angle, e.g., 90°, with respect to the first reference axis, for filtering out information not corresponding to the light point devices, and for outputting one-dimensional information that includes the ID of a light point device, a position of the light point device along the first reference axis and a position of the light point device along the second reference axis; and second imaging means for imaging light in the motion capture environment along a third reference axis and a fourth reference axis oriented at a second predetermined angle with respect to the third reference axis, for filtering out information not corresponding to the light point devices, and for outputting one-dimensional information that includes the ID of a light point device, a position of the light point device along the third reference axis and a position of the light point device along the fourth reference axis. Corresponding one-dimensional information from the first and second imaging means are sufficient to yield a three-dimensional (3D) location an a light point device.

The objects of the present invention are fulfilled by providing the motion capture system that further comprises third processing means for triangulating three-dimensional positions of the light point devices based upon, for a given one of the light point devices, the one-dimensional information from one of the first and second imaging means and a portion of the one-dimensional information from the other of the first and second imaging means.

Each of the first imaging means and the second imaging means of the motion capture system of the invention includes: a first microprocessor for digitally processing analogs of the light imaged on a respective one of the first or third reference axis, for filtering out information not corresponding to the light point devices, and for outputting one-dimensional information including a pixel location on the one of the first and third reference axis and a corresponding amplitude of the pixel location; a second microprocessor for digitally processing analogs of the light imaged on a respective one of the second or fourth reference axis, for filtering out information not corresponding to the light point devices, and for outputting one-dimensional information including a pixel location on the one of the second or fourth reference axis and a corresponding amplitude of the pixel location; and a third microprocessor for processing the one-dimensional information from the first microprocessor and the second microprocessor and for outputting the one-dimensional image information for each light point device in the form of a data packet including an ID, an indicator indicating the ID as being associated with one of the first or third reference axis, or one of the second or fourth second reference axis, respectively, and a location on the corresponding reference axis.

The first and second microprocessors of the first and second imaging means of the invention are operable to determine a centroid for each light point device and to incorporate the centroid into the one-dimensional information output therefrom such that the one-dimensional information output therefrom has sub-pixel resolution.

The motion capture system of the present invention operates in real time by reporting highly accurate guessed positions of the light point devices. The one-dimensional image information output by the first and second imaging means represents predictions set a predetermined number, I, of frames in the future. These predictions are based upon one-dimensional information 1D_INFO of a current frame, H, namely 1D_INFO (H), such that the prediction is 1D_INFO(H+I), e.g., I=3.

The invention is a recognition that if separated properly into stages, i.e., distributed, much of the processing involved in optical tracking and triangulation can be performed in parallel because the data in many of those stages is independent. Moreover, breaking the processing into stages permits a great deal of irrelevant information from the CCDs to be discarded before it is processed much. As such, the distributed processing can be performed by conventional processors. Without the distributed processing, i.e., as consolidated processing, the computational power required either would not be available, or would be prohibitively expensive.

The objects of the present invention are fulfilled by providing a two-dimensional camera for a motion capture system, the camera comprising: a first cylindrical collimating and telecentric (CCT) lens system oriented perpendicularly to a first reference axis; a first linear photosensor, lying along the first reference axis, for imaging light transferred through the first CCT lens system; a second CCT lens system oriented perpendicularly to a second reference axis, the second reference axis being oriented at a predetermined angle to the first reference axis; and a second linear photosensor, lying along the second reference axis, for imaging light transferred through the second CCT lens system.

The CCT lens system of the invention is preferably formed of a cylindrical collimating (CC) sub-system superimposed on a cylindrical telecentric (CT) sub-system.

The two-dimensional camera of the invention can be split in half to provide a linear photosensor for imaging light transferred through a single CCT lens system preferably organized as a cylindrical collimating (CC) sub-system superimposed on a cylindrical telecentric (CT) sub-system.

The objects of the present invention are fulfilled by providing a system for providing plural light point devices for use with a motion capture system, the system comprising: first means for generating and transmitting synchronization signals; a plurality of light point devices; and second means for receiving the synchronization signals and for modulating outputs of each of the light point devices, e.g., infrared LEDs, to provide a unique sequence of light pulses representing a unique identifier (ID) for each of the light point devices according to a predetermined cycle of modulation intervals based upon the synchronization signals. The second means is operable to modulate the light point devices such that at least two of the light point devices concurrently provide light during the cycle. This system preferably communicates via radio frequency (RF) radiation.

The objects of the present invention are fulfilled by providing a distributed-processing motion capture system comprising: at least one light point cluster structure in a motion capture environment, each light point cluster structure including at least three light point devices fixed in a predetermined configuration, each light point device being operable to provide a unique sequence of light pulses representing a unique identity (ID) of a light point device; and imaging means for imaging light in the motion capture environment along a first reference axis and a second reference axis oriented at a first predetermined angle with respect to the first reference axis, for filtering out information not corresponding to the light point devices, and for outputting one-dimensional information that includes the ID of a light point device, a position of the light point device along the first reference axis and a position of the light point device along the second reference axis.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein

FIGS. 14A–14F depict the formats of various states of information used by the motion capture system according to the invention;

FIG. 19 is a table of reported identifiers (IDs) according to the invention.

DETAILED DESCRIPTION OF THE PREFERRED EMBODIMENT

Figure 1:
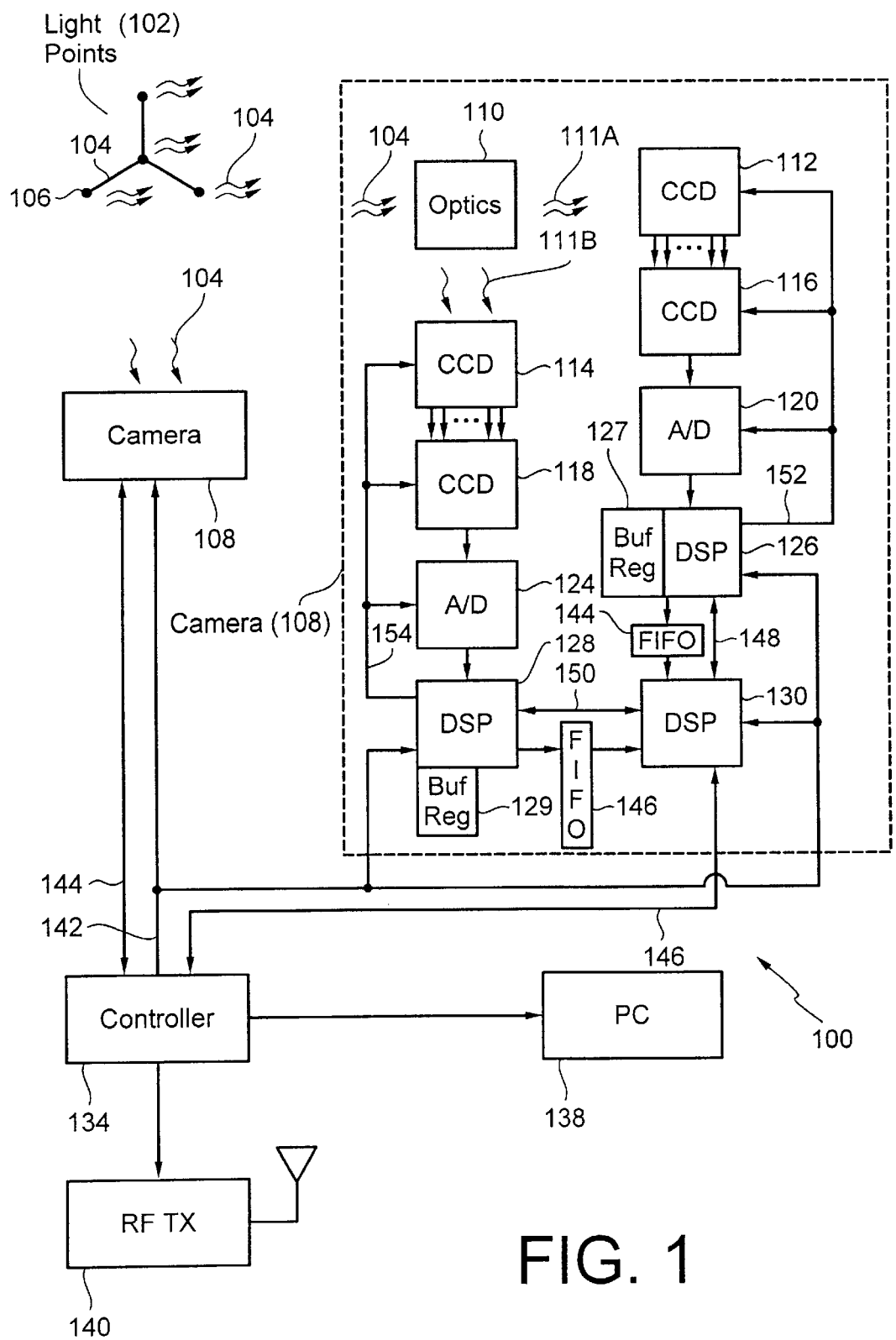
FIG. 1 is a block diagram of a motion capture system according to the invention.

Structure of FIG. 1

FIG. 1 is a block diagram of a motion capture system according to the invention. The system 100 of FIG. 1 includes a module 102 of light point devices 106 located within a motion capture environment, a plurality of cameras 108, a controller 134, a radio frequency (RF) transmitter (TX) 140, and a personal computer (PC) 138. The controller is connected to the cameras 108 via a unidirectional synchronization (synch) signal path 142 and by the bidirectional signal paths 144 and 146.

Each camera 108 of FIG. 1 includes an optics system 110 (to be discussed in more detail below), focusing light onto charge coupled devices (CCDs) 112 and 114. The CCDs 112 and 114 have parallel connection paths to the CCD 116 and 118. The CCDs 118 and 116 have serial connection paths to digital signal processors (DSPs) 126 and 128 via analog to digital (A/D) converters 120 and 124, respectively.

It is noted that an image of a light point device 106 on CCDs 112 and 114 is not constrained to a single pixel. Rather, it takes the form of a Gaussian curve spread over 3 to 18 pixels, depending upon resolution of CCD1 and whether the image source is generally located near the focus of the lens system (smaller spread) or out of focus but within the filed of view (larger spread).

The DSP 126 provides timing signals to the CCDs 112 and 116, and the A/D converter 120 via the signal path 152. Similarly, the DSP 128 provides timing signals to the CCDs 114 and 118, and the A/D converter 124 via the signal path 154. The DSPs 126 and 128 have buffer registers 127 and 129, respectively, connected thereto. The buffer registers are preferably circulating shift registers. Alternatively, the buffer registers 127 and 129 could be portions of the RAM inherent to the DSPs 126 and 128.

Each camera 108 of FIG. 1 further includes a DSP 130 to which the DSPs 126 and 128 are connected via serial signal paths passing through first-input-first-output (FIFO) buffers 144 and 146, respectively. The DSPs 126 and 128 are also connected to the DSP 130 via the bidirectional signal paths 148 and 150, respectively.

The synch signal path 142 is connected to each of the DSPs 126, 128 and 130. The bidirectional signal path 146 between the controller 134 and the camera 108 connects to the DSP 130.

The CCDs 112 and 116, and 114 and 118, cooperate under the control of the DSPs 126 and 128, respectively, to provide electronic shuttering in a well known manner.

The minimum number of cameras needed by the MC system of the invention is one, which requires fixed positions and orientation of at least 3 LEDs in a predetermined configuration (a light point cluster structure) such as a triangle or square, where the shape of the configuration does not change when the object to which the configuration is attached moves. It is preferred to have eight. The eight cameras should be placed in the room so as to encircle the capture volume, e.g., placed every 45° around the room, namely, at 0°, 45°, 90°, 135°, etc. If using only two cameras, they should be placed several feet apart facing the same direction, so that they only capture front facing LEDs and so that both cameras have nearly the same probability of imaging a given LED.

The light point devices 106 in FIG. 1 are depicted at the corners of a calibration jig 104. In actuality, additional light point devices would be attached to other objects to measure the objects' stationary positions, and/or to moving subjects, such as a person, to measure the motion thereof. To calibrate positions of the cameras in the system, however, it is necessary to use the jig 104. The jig 104 is a structure configured as a unit coordinate reference system (CRS), i.e., as three orthonormal line segments, e.g, each one meter long, intersecting at the same point. The intersection of the line segments 104 is the origin of the CRS, while each segment is preferably one meter in length. A light point device 106 is attached at the origin and at the ends of the line segments.

As an alternative or supplement to the calibration jig 104, a test array of light point devices can be provided. Circuitry must also be provided to individually address and modulate the light point devices. As another alternative or supplement to the calibration jig 104, a portable test arm equipped with light point devices can be provided. Such an arm would allow testing of high speed motion capture.

Alternatively, the DSPs 126 and 128 could be replaced by field programmable gate arrays (FPGAs) or custom processors. This alternative would permit faster processing at a lower hardware cost, but is currently less a less flexible implementation, and would require large production quantities to be more preferred.

Figure 2:
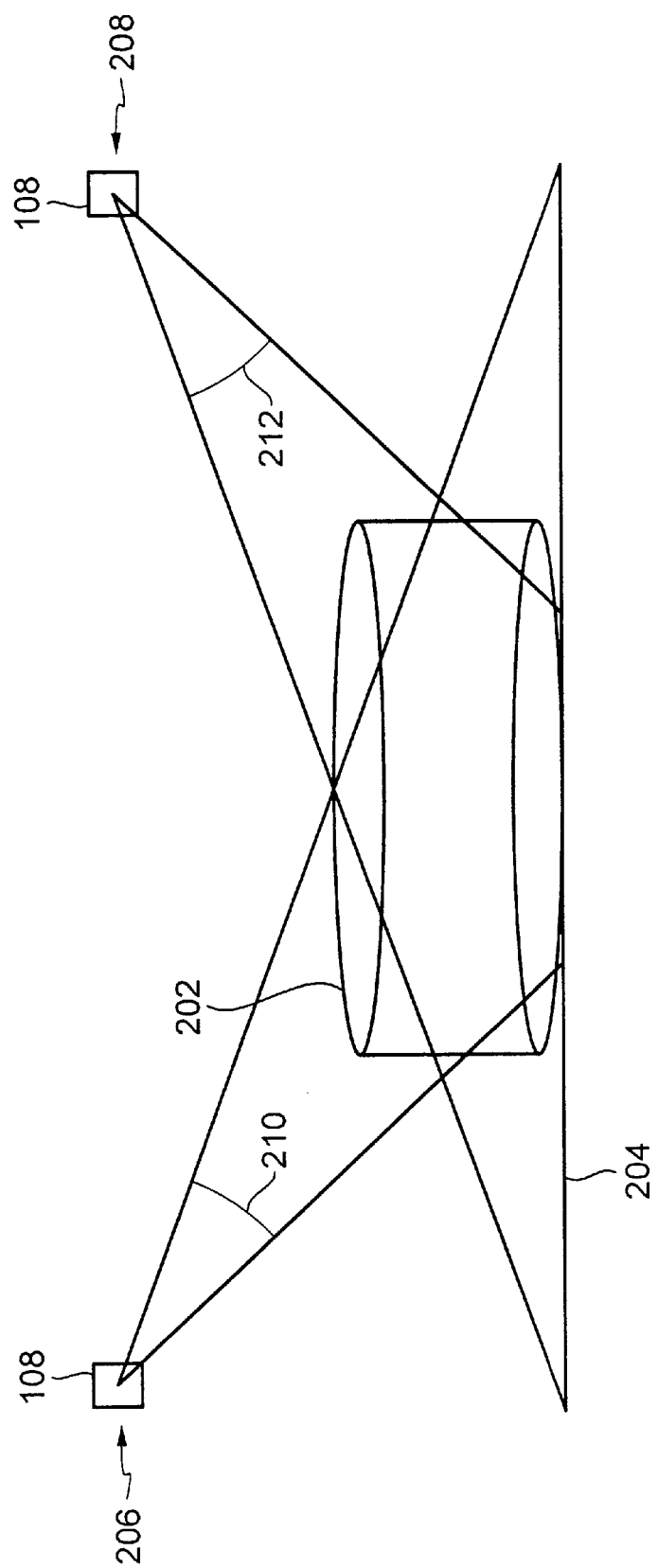
FIG. 2 is a prospective view of a motion capture environment in which the motion capture system of the invention will be used.

Structure of FIG. 2

FIG. 2 depicts the capture volume, i.e., the volume in which motion can be captured, as a cylindrical (CYL) section 202 positioned on a floor 204. The cameras 108 are mounted on the walls of a room (or on tripods) at differing heights 206 and 208 and the detectors, e.g., linear CCDs, are oriented at a predetermined angle of approximately 45° to the plane of the floor 204 or the plane of the walls. This is done to minimize the co-planarization of light point devices 106 that lie on a surface or that are oriented to a surface, taking into consideration that gravity tends to orient things perpendicular to the floor.

Figure 3:
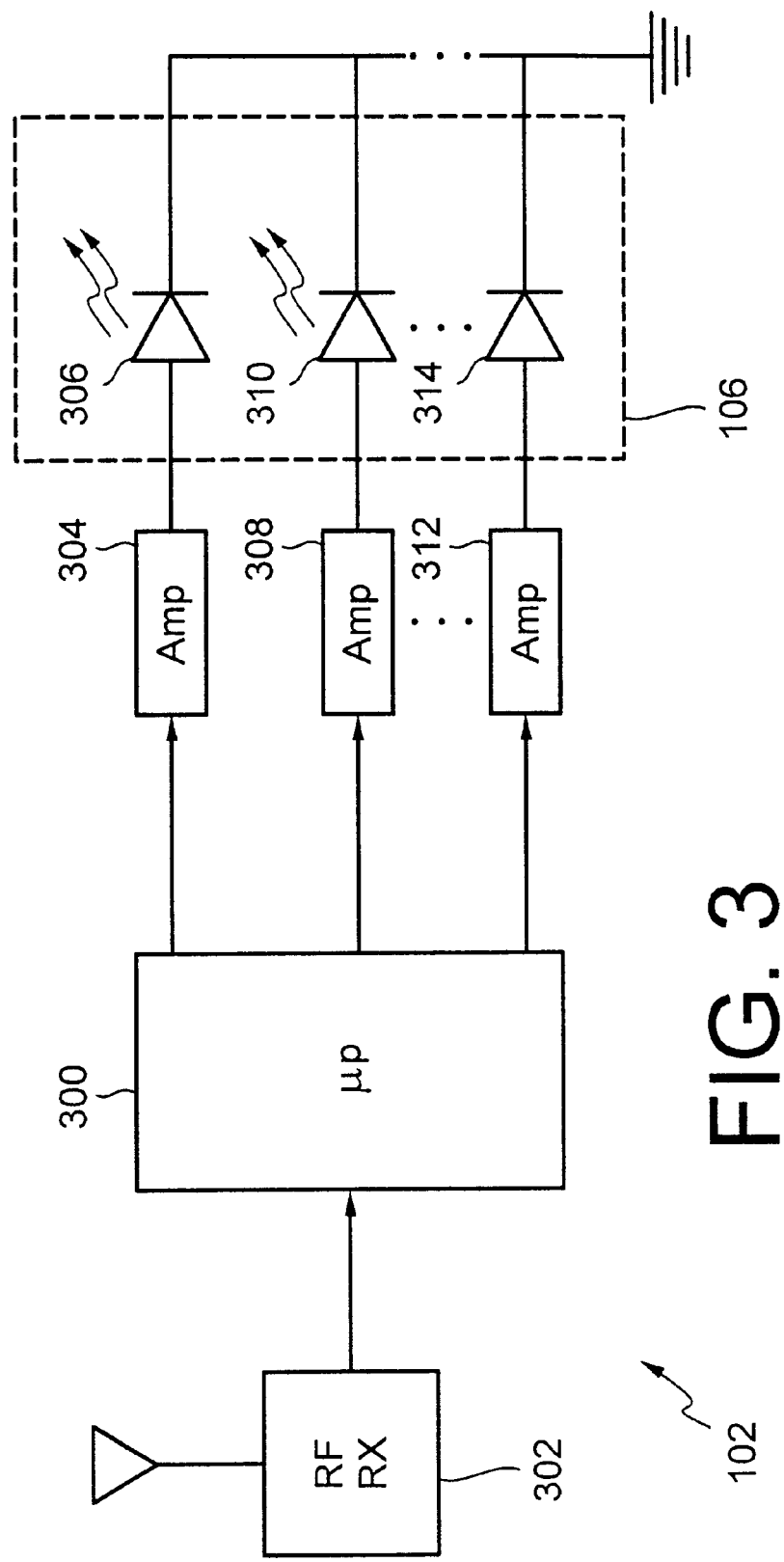
FIG. 3 is a block diagram depiction of a module of light point devices according to the invention.

Structure of FIG. 3

FIG. 3 depicts a block diagram of the module 102 of light point devices 106. The module 102 includes an RF receiver (RX) 302 connected to a microprocessor 300. The microprocessor 300 is connected individually to each of amplifier circuits 304, 308 and 312. The amplifier circuits 304, 308 and 312 are each connected individually to light emitting diodes (LEDs) 306, 310 and 314, the second terminal of which is commonly connected to ground. The LEDs 304, 310 and 314 are preferably infrared LEDs.

The light module 102 is self-contained, i.e., it has its own power supply (not depicted) in the form of a battery.

The number of LEDs of the light module 102 is preferably between 1 and 10. This range reflects a balancing of the considerations of battery life (in view of power consumption), the size of the module 102, and the number of cables deemed to be an acceptable amount emanating from the housing of the module 102.

Structure of FIG. 4

FIG. 4 illustrates the two basic sensing components of the cameras 108 of FIG. 1, namely a plano-convex cylindrical (CYL) lens 404 and a linear, or one-dimensional array, CCD 402. Together, the lens 404 and the CCD 402 define a unit sensor 400.

Figure 5:
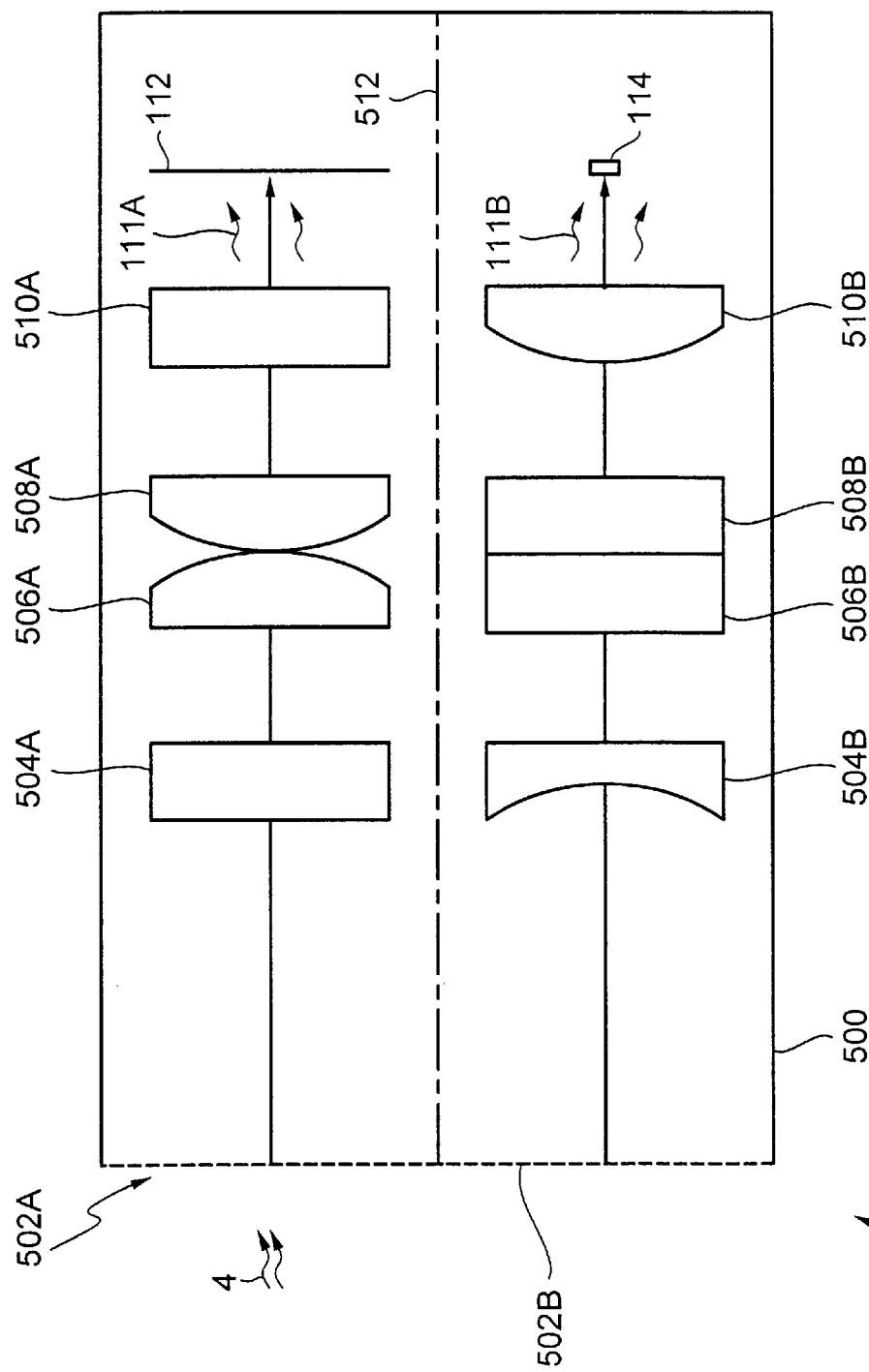
FIG. 5 is a side view of the optics system according to the invention.

Optics of FIG. 5

FIG. 5 is a side view depicting the optical system 110 of FIG. 1, in which a first system focuses light for CCD 112 while a second system focuses light for CCD 114. The optical components of the first and second systems of FIG. 5 correspond to those of FIG. 6, which are depicted from a three-quarter perspective view. As such, it is recommended that FIG. 6 be viewed in conjunction with FIG. 5.

In FIG. 5, a housing 500 encloses a plurality of lenses organized as the first and second system. The components of the first system are: a first aperture 502 in the housing 500: a plano-concave cylindrical (CYL) lens 504A whose concave surface is oriented toward the aperture 502; a plano-convex CYL lens 506A of which the axis of symmetry for the convex surface is perpendicular to the axis of symmetry for the concave surface of the lens 504A and of which the planar surface is parallel to the planar surface of the lens 504A; a plano-convex CYL lens 508A of which the axis of symmetry for the convex surface also is perpendicular to the axis of symmetry for the concave surface of the lens 504A, of which the planar surface also is parallel to the planar surface of the lens 504A, and of which the convex surface is adjacent to the convex surface of the lens 506A; and a plano-convex CYL lens 510 of which the axis of symmetry for the convex surface is parallel to the axis of symmetry for the concave surface of the lens 504A and of which the planar surface is parallel to the planar surfaces of the lenses 506A and 508A.

The second system of FIG. 5 is identical to the first albeit rotated 90°. The components defining the second system are: a second aperture 502B in the housing 500; a plano-concave CYL lens 504B whose concave surface is oriented toward the aperture 502, of which the axis of symmetry for the concave surface is perpendicular to the axis of symmetry for the concave surface of the lens 504A; a plano-convex CYL lens 506B of which the axis of symmetry for the convex surface is perpendicular to the axis of symmetry for the concave surface of the lens 504B and to the axis of symmetry for the concave surface of the lens 506A, and of which the planar surface is parallel to the planar surface of the lens 504B; a plano-convex CYL lens 508B of which the axis of symmetry for the convex surface also is perpendicular to the axis of symmetry for the concave surface of the lens 504B, of which the planar surface also is parallel to the planar surface of the lens 504B, and of which the convex surface is adjacent to the convex surface of the lens 506B; and a plano-convex CYL lens 510 of which the axis of symmetry for the convex surface is parallel to the axis of symmetry for the concave surface of the lens 504B and of which the planar surface is parallel to the planar surfaces of the lenses 506B and 508B.

In FIG. 5, it is important to observe that the CCD 112 is depicted as being in the plane of the page on which FIG. 5 is drawn while CCD 114 is depicted as being perpendicular to the plane of the page, i.e., perpendicular to the CCD 114. As such, CCD 112 images light point devices as bright pixels positioned along a first axis while CCD 114 images light point devices as bright pixels positioned along a second axis perpendicular to the first axis. Preferably, the first and second axes align with two of the reference axes in a coordinate reference system (CRS).

To make the optics system 110 as compact as possible, the two systems have parallel center lines and are mounted in one housing. Alternatively, the first and second sub-systems could be treated as separate cameras having their own housing, as indicated by the line 512 in FIG. 5. If the first and second sub-systems are treated as separate cameras, their CCDs 112 and 114 should be oriented as nearly the same as on the single camera implementation.

Alternatively, the lenses of the invention can be compound lenses.

The invention also contemplates several examples of alternative lens arrangements for the first and second lens systems. To simplify the depiction of the alternatives, only one of the first and second systems will be depicted in FIGS. 6A, 6B, 6C, 7, 8, 9, 10 and 11.

Figure 6A:
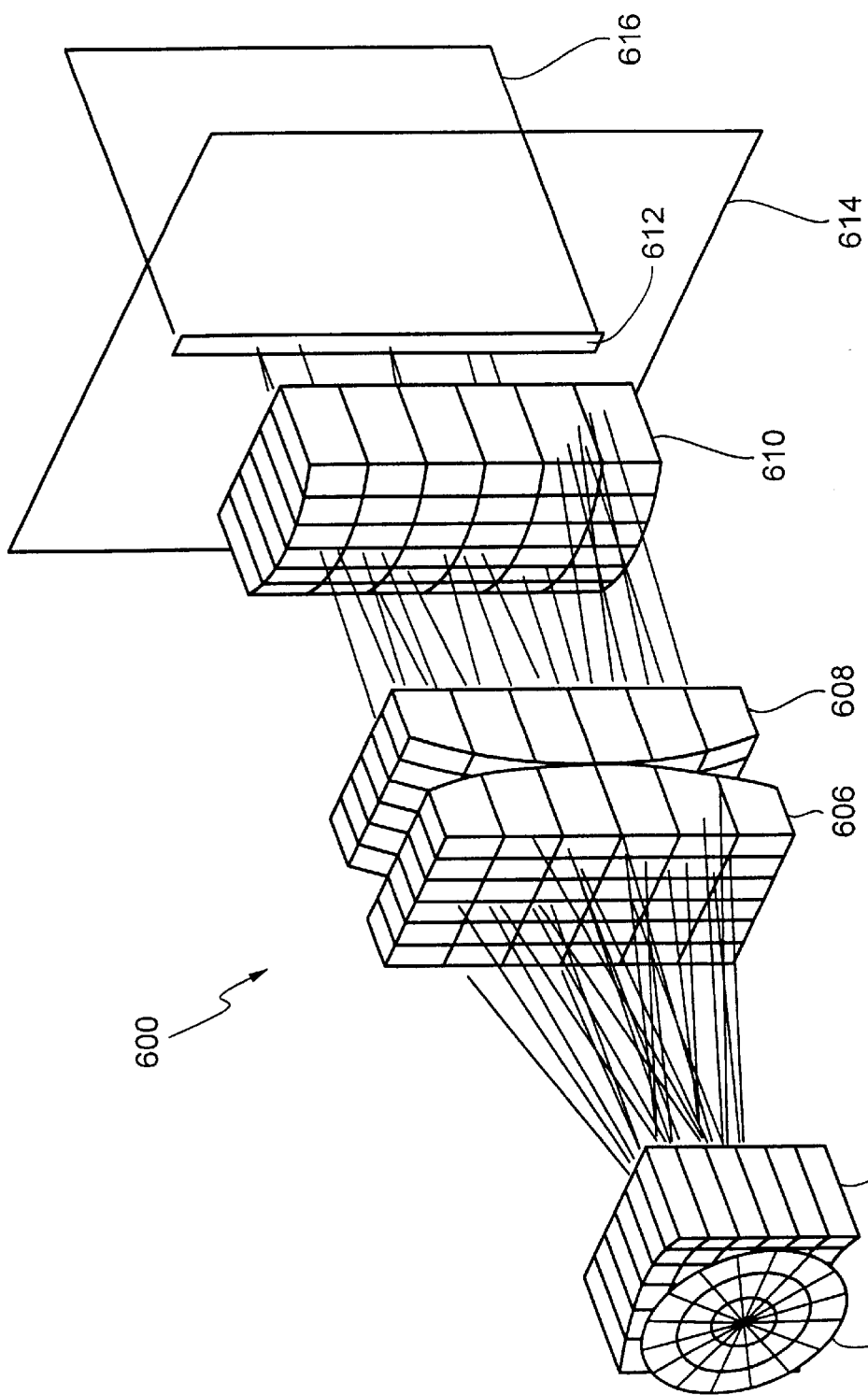
FIG. 6A is a three-quarter prospective view of an optics sub-system according to the invention.

Optics of FIG. 6A

As mentioned above, FIG. 6 depicts a three-quarter perspective view of the either the basic system corresponding to the first or second systems of FIG. 5.

In FIG. 6, light from an aperture 602 travels through several lenses to a CCD 612 along a path passing through the following components, which are: a plano-concave CYL lens 604 whose concave surface is oriented toward the aperture 602; a plano-convex CYL lens 606 of which the axis of symmetry for the convex surface is perpendicular to the axis of symmetry for the concave surface of the lens 604 and of which the planar surface is parallel to the planar surface of the lens 604; a plano-convex CYL lens 608 of which the axis of symmetry for the convex surface also is perpendicular to the axis of symmetry for the concave surface of the lens 604, of which the planar surface also is parallel to the planar surface of the lens 604, and of which the convex surface is adjacent to the convex surface of the lens 606; and a plano-convex CYL lens 610 of which the axis of symmetry for the convex surface is parallel to the axis of symmetry for the concave surface of the lens 604 and of which the planar surface is parallel to the planar surfaces of the lenses 606 and 608.

Optionally and preferably, an infrared (IR) band pass filter (not depicted in FIG. 6A but see FIG. 7) is positioned between the lens 610 and the detector 612. The IR band pass filter is preferably glass with a thin film coating, hence its performance is optimized by placing it where light impinges as perpendicular to it as possible, namely between the lens 610 and the detector 612.

Optionally, the aperture 602 could include a filter. Alternatively and preferably, a separate red glass filter (not depicted) could be inserted anywhere between the aperture 602 and the CCD 612, although it is preferred that a filter be located between the aperture 602 and the lens 604. In this alternative, the red glass filter would function as a high pass filter while the IR filter would function as a low pass filter.

Optionally, a field flattening lens (not depicted) could be inserted between the lens 610 and the CCD 612.

The plane of the detector is identified by reference (ref.) number (no.) 616. The plane perpendicular to the detector is identified by ref. no. 614.

The optical system depicted in FIG. 6A is really a first sub-system superposed with a second sub-system. The first sub-system is a cylindrical collimating system acting in the plane 614 perpendicular to the CCD 612 and defined by the plano-concave CYL lens 604 and the plano-concave CYL lens 610, and is depicted in isolation in FIG. 6B. The second sub-system is a cylindrically telecentric system acting in the plane 616 of the CCD 612 and defined by the aperture 602, the plano-convex CYL lens 606 and the plano-convex CYL lens 608, a variation of which is depicted in isolation in FIG. 8.

Figure 6B:
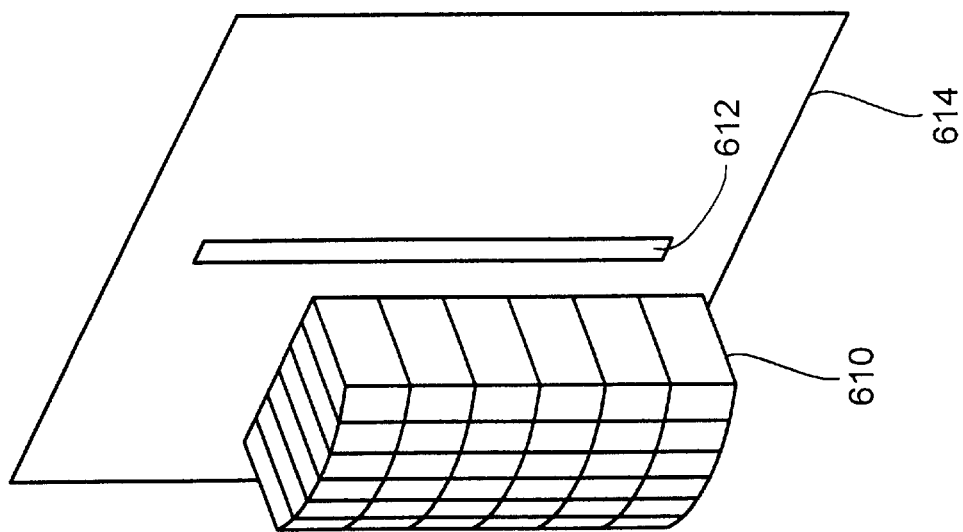
FIG. 6B is a three-quarter prospective view of another optics sub-system of the invention.
Figure 6B:
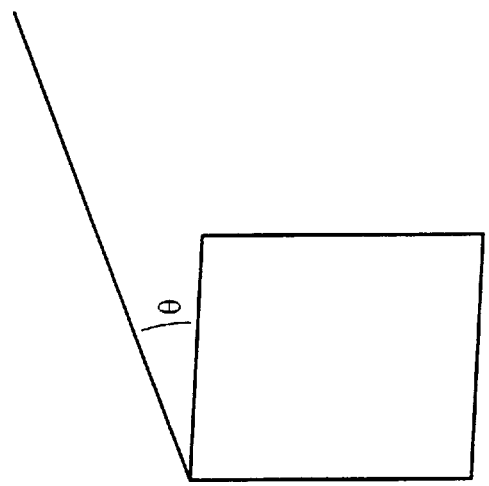
Figure 6B:
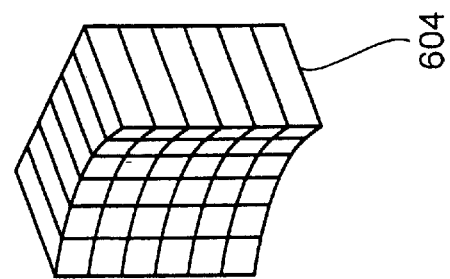

Optics of FIG. 6B

FIG. 6B depicts a three-quarter perspective view of the collimating system of FIG. 6A. The lenses 604 and 610 collimate light onto the CCD 612.

The plano-concave CYL lens 604 spreads or fans out light (for a negative gain, i.e., loss) at an angle θ in a plane perpendicular to the axis of symmetry for the concave surface of the lens 604. As such, only light with a low value ofθ reaches the CCD 612. This creates a more uniform path so that the telecentric system has a greater sharpness or smaller image. The lens 610 refracts more light onto the detector, providing positive optical gain.

Figure 6C:
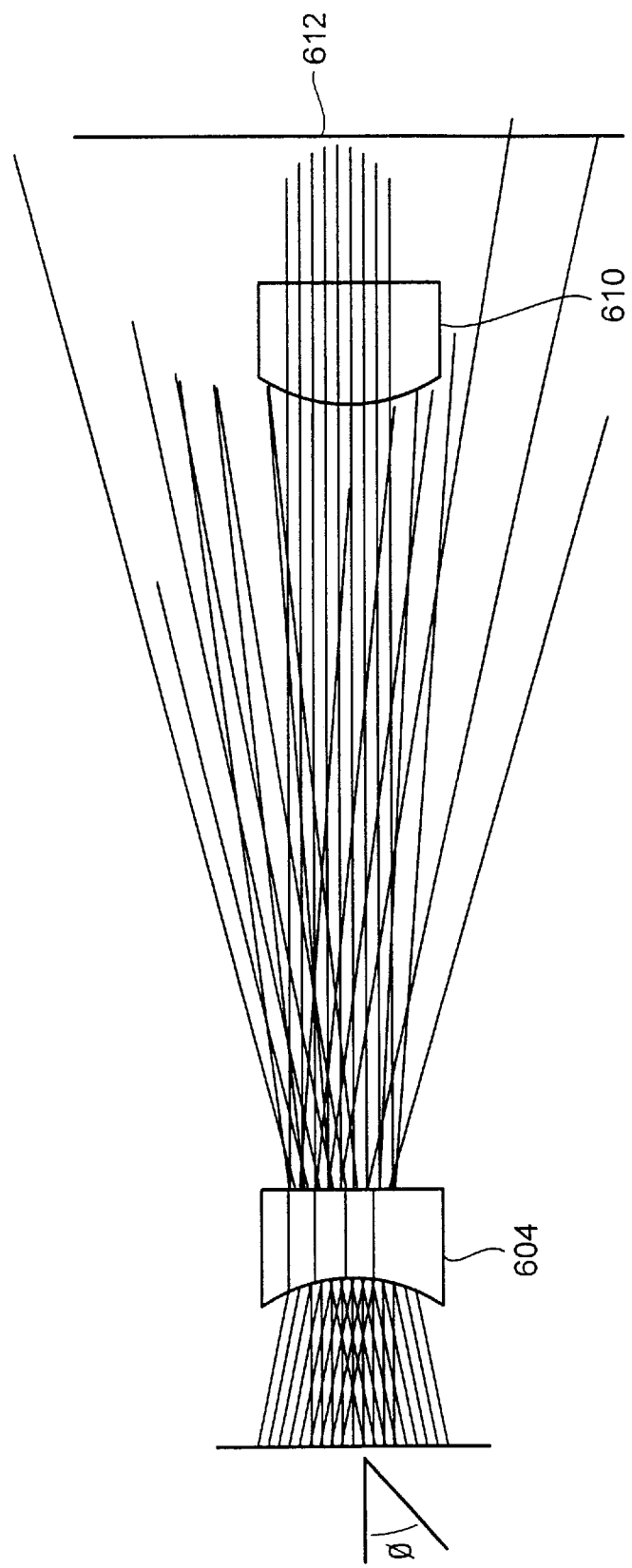
FIG. 6C is a top view of the sub-system of FIG. 6b.

Optics of FIG. 6C

FIG. 6C is a top view of the collimating system depicted in FIG. 6B. The concave surface of the lens 604 refracts light causing it to fan out so that the maximum viewing angle φ, in a plane perpendicular to the axis of symmetry of the concave surface of the lens 604, of the system increases.

The CCD 612 of FIG. 6C is depicted as being perpendicular to the page on which FIG. 6C is drawn. Rays of light passing above and below the CCD 612 are wasted.

Figure 11:
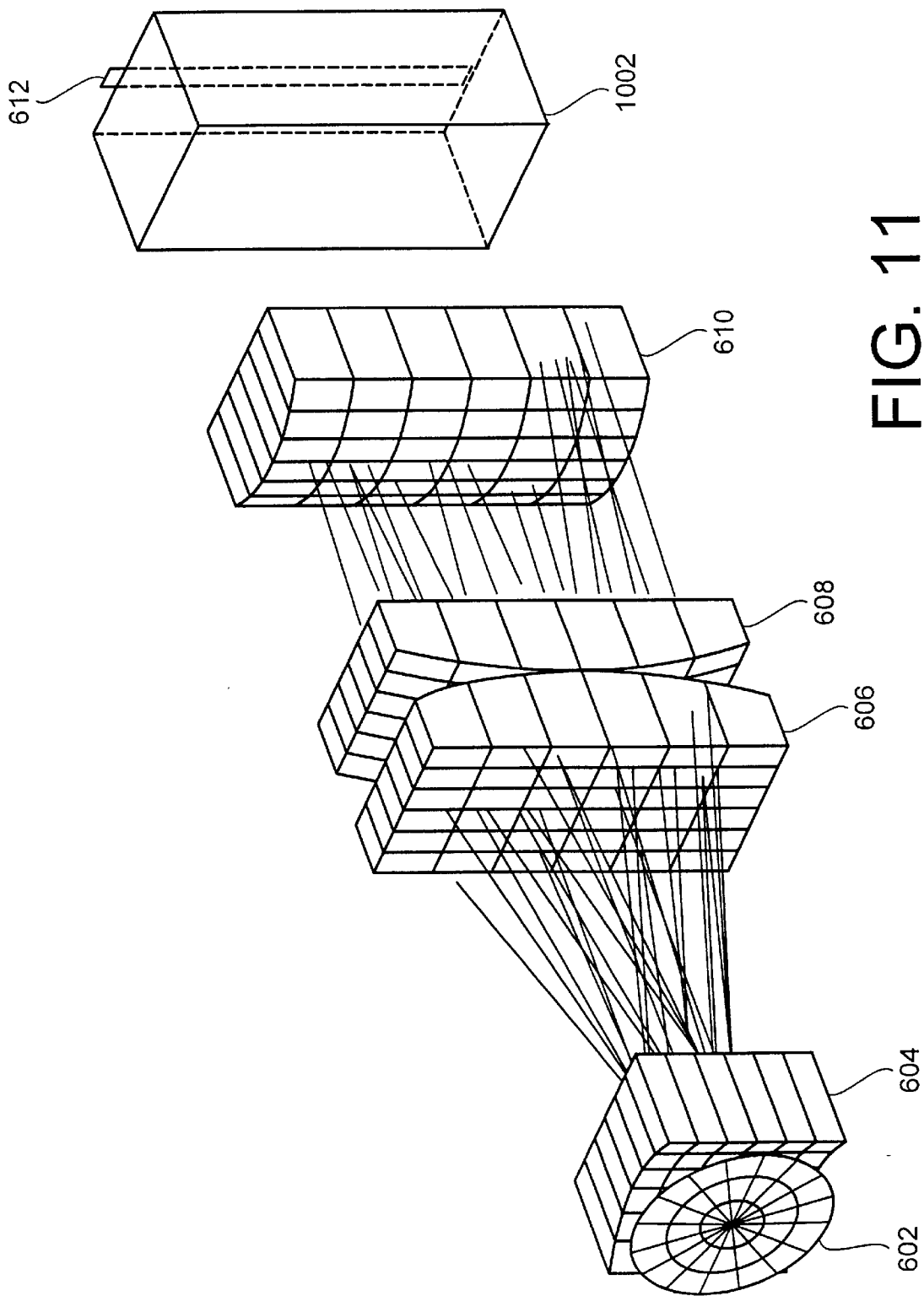
FIG. 11 is a three-quarter prospective view of another optics sub-system according to the invention.

Alternatively, the lens 610 could be replaced by a cylindrical gradient index lens (not depicted in FIG. 6C, but see FIG. 11). This would increase the amount of light focused upon the CCD 612, thus increasing the optical gain.

Figure 7:
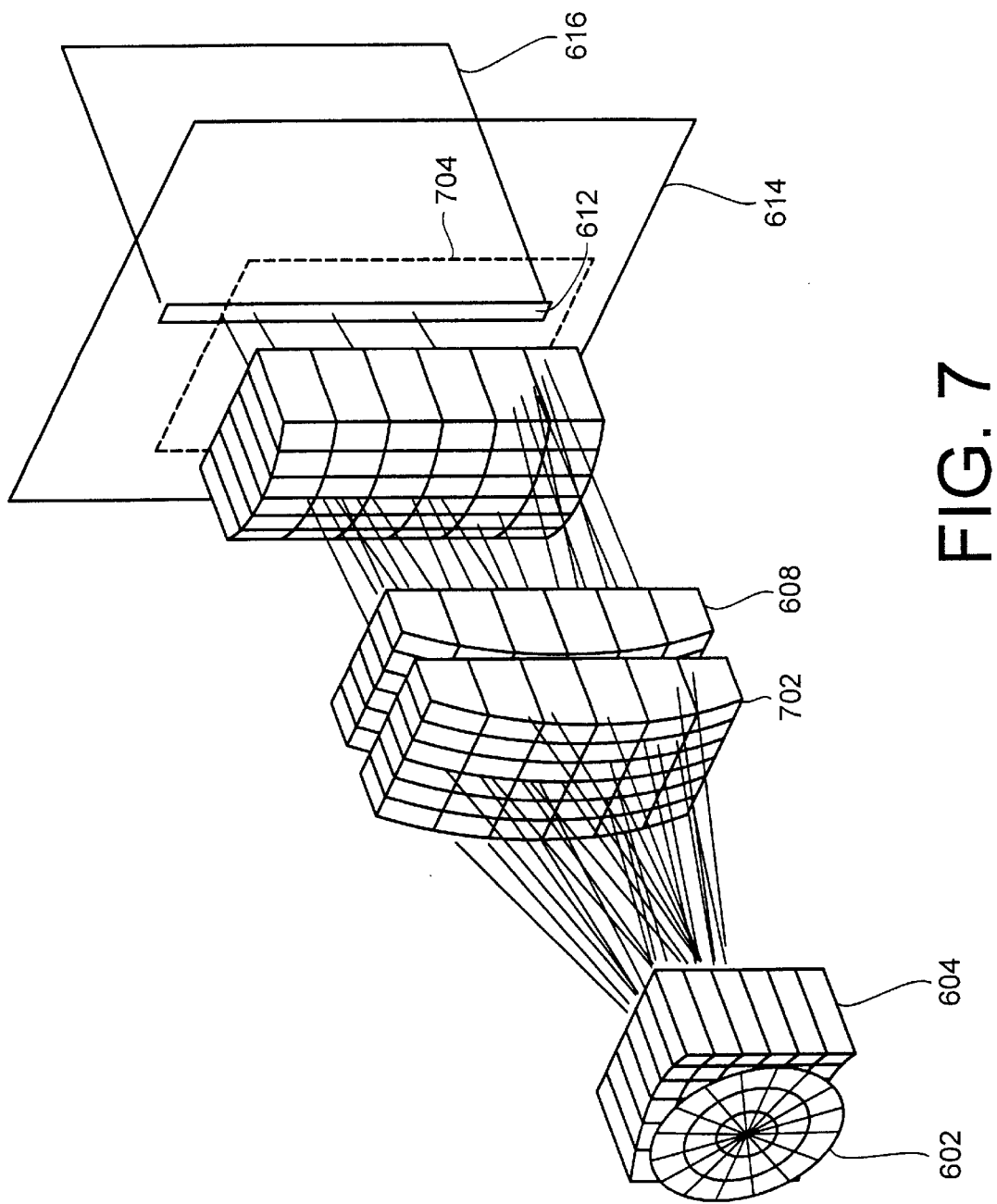
FIG. 7 is a three-quarter prospective view of an alternate optics system according to the invention.

Optics of FIG. 7

FIG. 7 depicts a three-quarter perspective view of an alternative arrangement of the cylindrical telecentric sub-system of FIG. 6A. In FIG. 7, the orientation of the plano-convex CYL lens 606 of FIG. GA has been reversed, and is depicted as a plano-convex CYL lens 702.

The plano-convex CYL lens 702 still has an axis of symmetry for the convex surface which is perpendicular to the axis of symmetry for the concave surface of the lens 604 and still has a planar surface that is parallel to the planar surface of the lens 604. However, the convex surface of the lens 702 is not adjacent to the convex surface of the lens 606, rather the planar surface of the lens 702 is adjacent to the convex surface of the lens 608.

The optional IR band pass filter is denoted with reference number 704.

Figure 8:
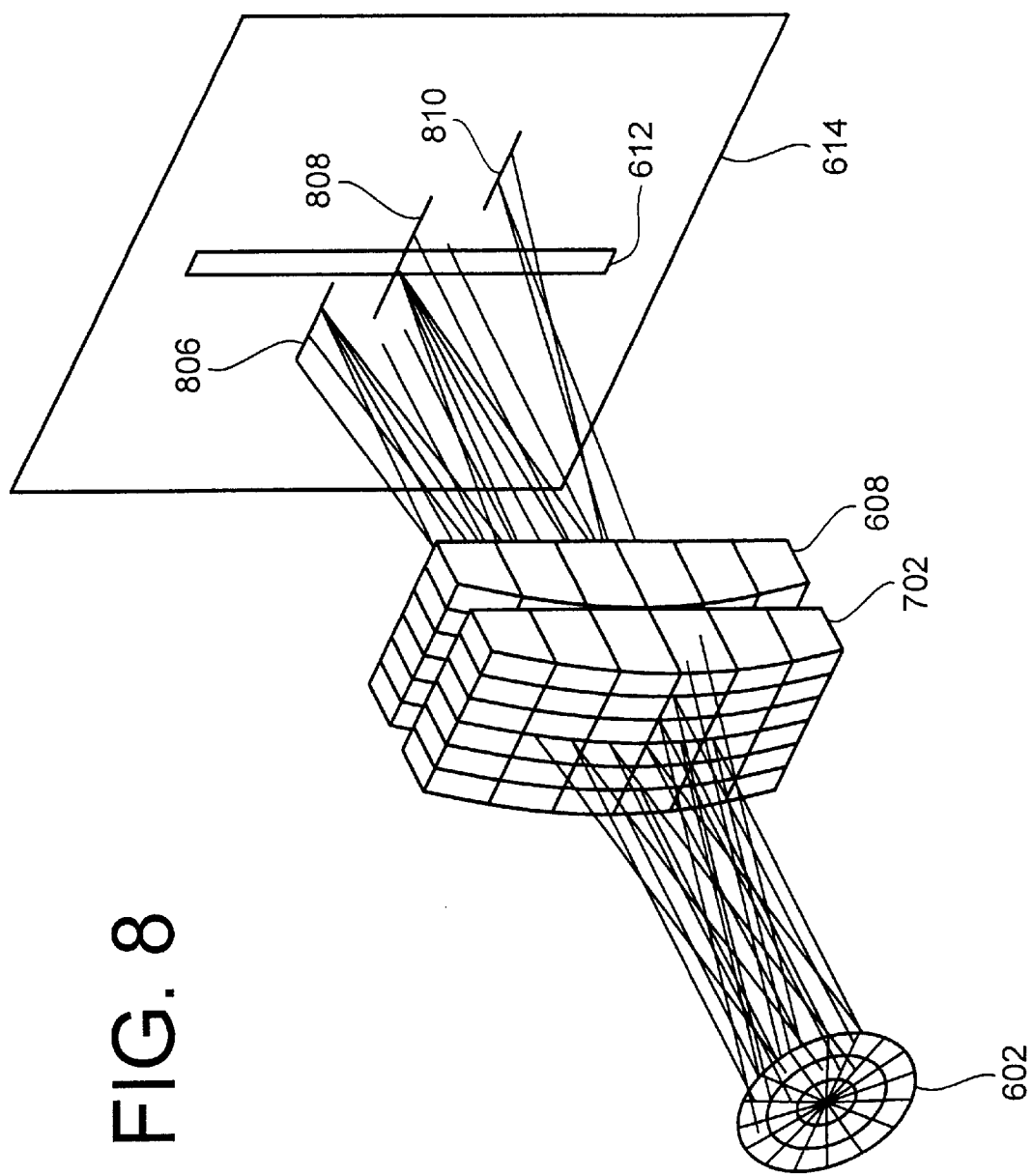
FIG. 8 is a three-quarter prospective of another optics sub-system according to the invention.

Optics of FIG. 8

FIG. 8 depicts a three-quarter perspective view of the alternative cylindrical telecentric sub-system depicted in FIG. 7 in isolation. That is, FIG. 8 does not contemplate nor depict the collimating sub-system being shown.

Without the collimating sub-system, the telecentric sub-system would focus fewer images on the CCD 612. In FIG. 8, three images 806, 808 and 810 of light point devices have been depicted. Only one image, 808, intersects the CCD 612. If the collimating system were present, then the images 806 and 810 would also intersect the CCD 612 because the collimating system fans out light, i.e., it acts, in the plane 614 perpendicular to the CCD 612.

Figure 9:
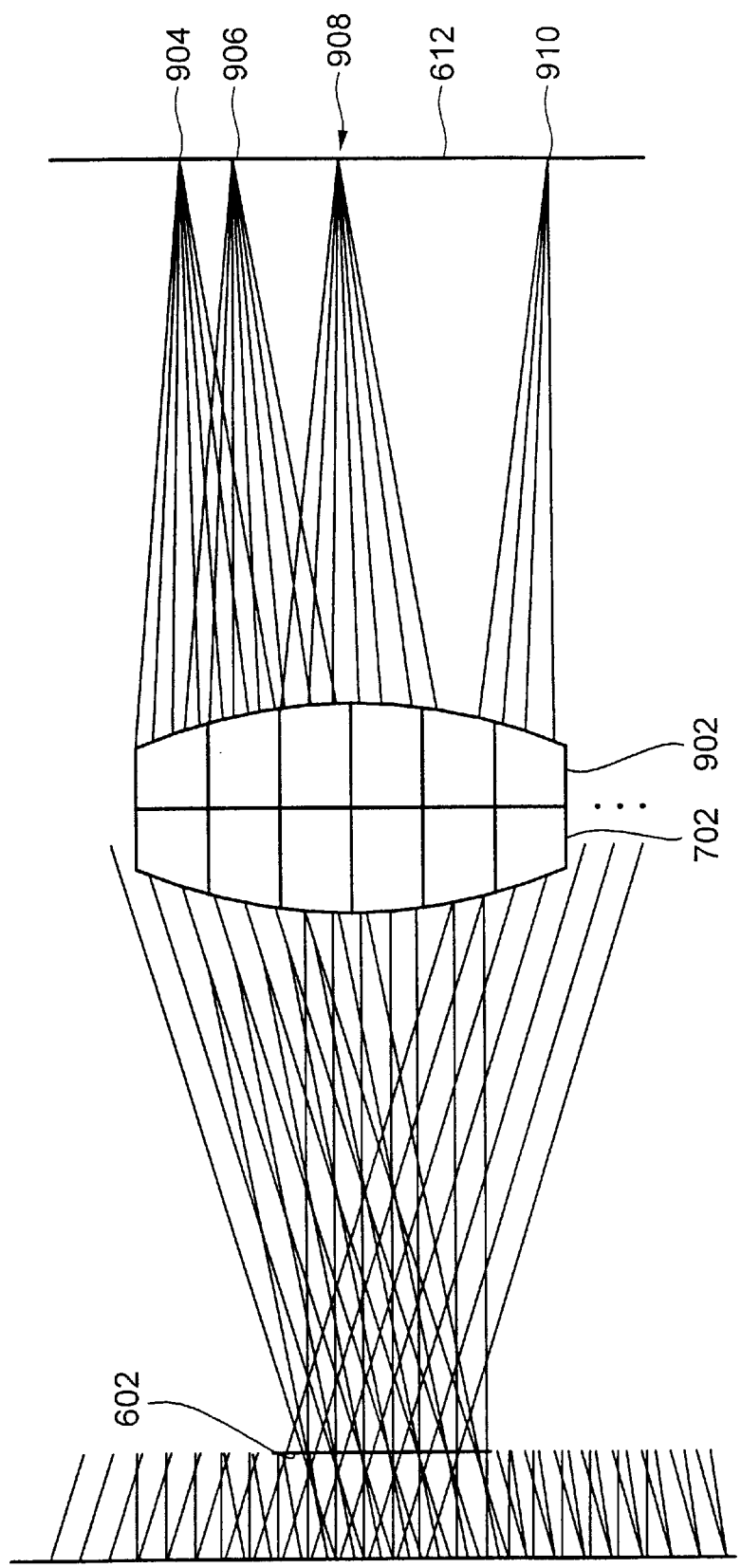
FIG. 9 is a side-view of another optics sub-system according to the invention.

Optics of FIG. 9

FIG. 9 depicts a side view of an alternative arrangement of the cylindrical telecentric sub-system of FIGS. 6A. This is also an alternative arrangement of the cylindrical telecentric sub-system of FIGS. 7 and 8. In FIG. 9, the orientations of the plano-convex CYL lenses 606 and 608 of FIG. 6A have been reversed, and are depicted as plano-convex CYL lenses 702 (the same lens as in FIGS. 7 and 8) and 902.

The plano-convex CYL lens 902 still has an axis of symmetry for the convex surface which is perpendicular to the axis of symmetry for the concave surface of the lens 604 of FIG. 6A and has a planar surface that is parallel to the planar surface of the lens 702. However, the planar surface of the lens 902 is now adjacent to the planar surface of the lens 702.

A cylindrical telecentric system provides parallel focal paths so that light incident at extreme angles has approximately the same focal length as light at small angles. The focal length of the lens 902 is selected so that light incident at extreme angles will be imaged. The system is a comprise between sharpness of an image and depth of field. To provide grater depth of field, the system attempts to provide maximum sharpness at maximum range. This has the effect of making the focal point of light incident at shorter distances shift beyond the detector 612. This has the effect of making the focal point of light incident at shorter distances shift beyond the detector 612. This is depicted in FIG. as focal point of image 908, in contrast to the focal points of images 904, 906 and 910, being located to the right of the CCD 612. This system improves the viewing angle as well as the depth of field.

Figure 10:
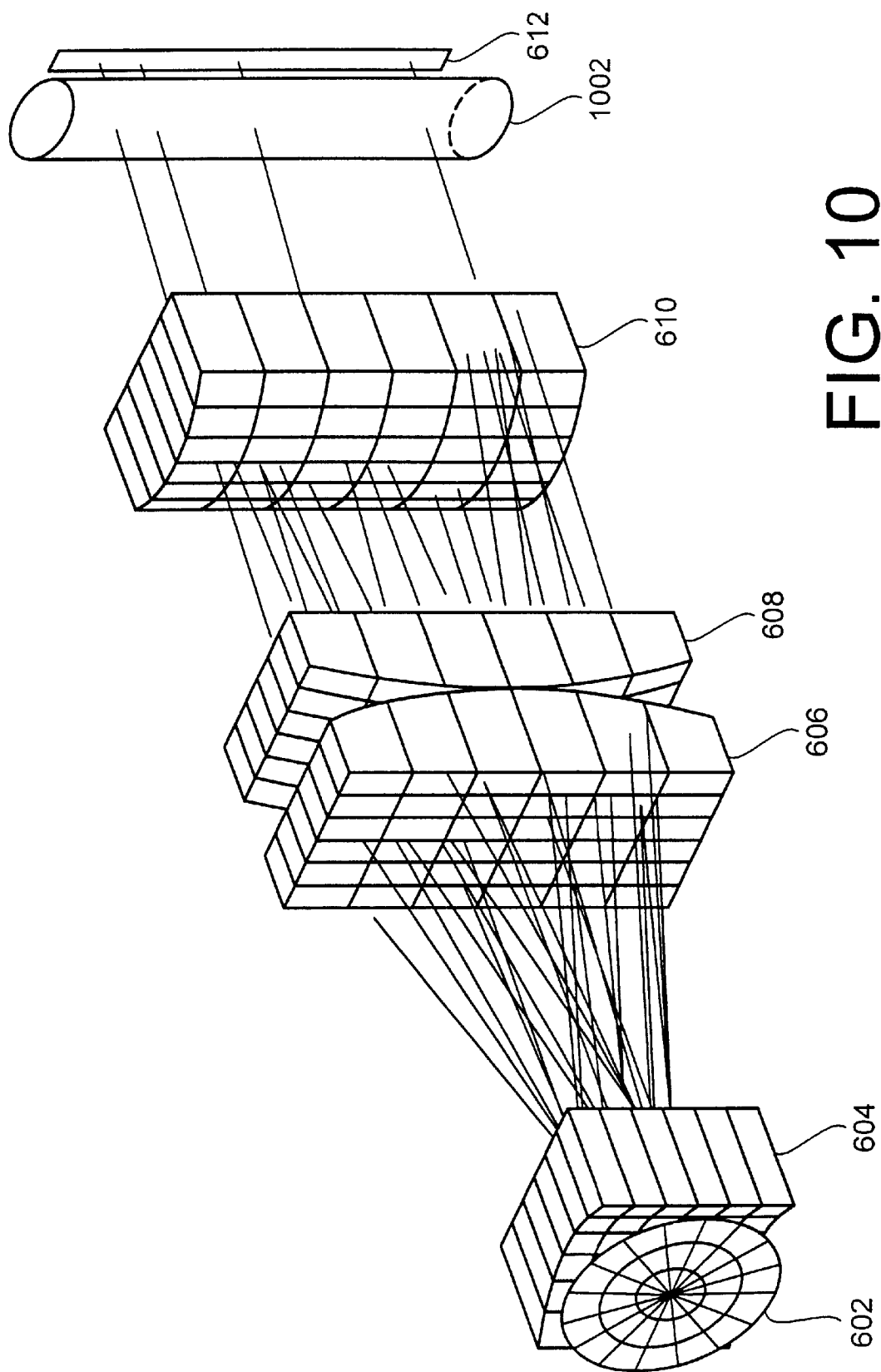
FIG. 10 is a three-quarter prospective view of another optics sub-system according to the invention.

Optics of FIG. 10

FIG. 10 depicts a three-quarter perspective of an embodiment that is an alternative to the embodiment of FIG. 6A. FIG. 10 includes a rod lens 1002 positioned immediately in front of the CCD 612. The rod lens 1002 is preferably has a diameter that, in effect, magnifies the width of the CCD 612. The rod lens 1002 increases the optical gain of the system.

Optics of FIG. 11

FIG. 11 depicts a three-quarter perspective of an most preferred embodiment that is an alternative to the embodiment of FIG. 6A. FIG. 11 includes a cylindrical gradient index lens 1102 positioned immediately in front of the CCD 612. The CYL gradient lens 1102 is preferably has a width that is at least three times the width of the CCD 612. The CYL gradient lens 1102 increases the optical gain of the system.

Figure 15:
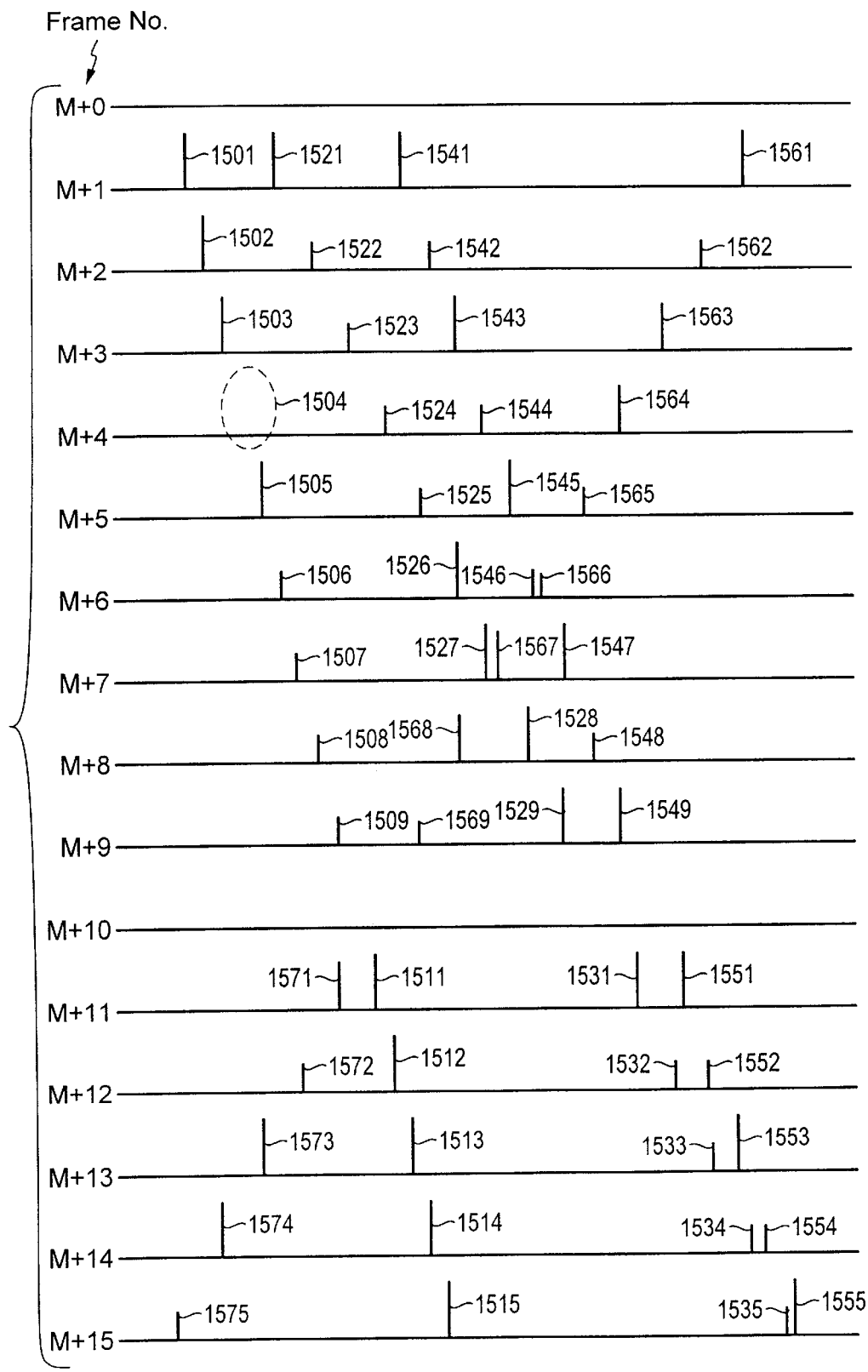
FIG. 15 is an example of the progression of images corresponding to light point devices over a plurality of frames.

Contents of FIG. 15

FIG. 15 depicts an example of the tracking, i.e., accumulation of historical data carried out by the DSP 130 of FIG. 1. In FIG. 15, four different light point devices have been imaged over the course of fourteen frames, from frame M+1 to frame M+10 and from frame M+11 to frame M+15. The first light point device corresponds to the images 1501 to 1515, which represent the sequences 111_1111 and 11111. The second light point device corresponds to images 1521 to 1535, which represent the sequences 100001111 and 10000. The third light point device corresponds to images 1541 to 1555, which represent the sequences 101010101 and 10101. The fourth light point device corresponds to images 1561 to 1575, which represent the sequences 101100110 and 10110.

Figure 16:
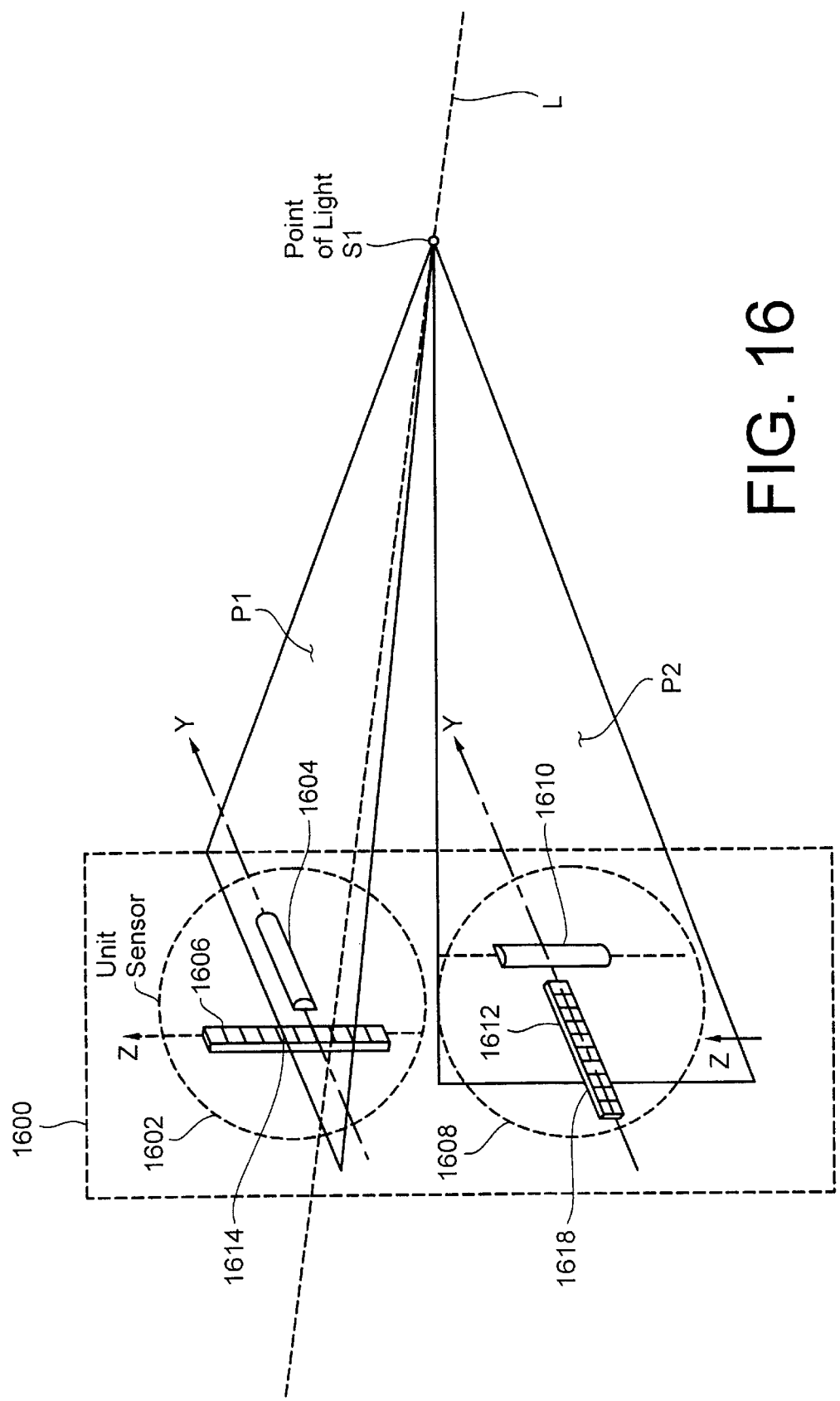
FIG. 16 depicts two unit sensors included in the invention.

Structure of FIG. 16

FIG. 16 depicts two unit sensors 1602 and 1608 in a camera 1600. The camera 1600 is analogous to the camera 108 of FIG. 1.

Operation of FIG. 1

A discussion of the operation of FIG. 1 follows. The motion capture (MC) system according to the invention uses plural light point devices mounted on a subject (or subjects) whose motion is to be captured. In a given frame, a camera in the system will image those light point devices in the field of view of the camera. Not all of the light point devices on the subject will be imaged by each camera in each frame because the moving subject(s) will block the lines of sight from many of the light point devices to the cameras. For each frame, assuming that one or more light point cluster structures is not used, it is only necessary for a light point device to be in the field of view of two cameras in order for the MC system of the invention to determine the position of the light point device in that frame.

However, it is not sufficient merely to establish the track of a light point device. Rather, the identifier of the tracked light point device of light must also be determined. In the MC system of the invention, each light point device provides light in a way that also transmits the identifier of the light point device. Each light point device modulates its output so that, for a given frame, a charge coupled device (CCD) will sense that a light point device has output either a binary logic "1" pulse or binary logic "0" pulse. Over the course of several frames, each light point device provides a sequence of "1s" and "0s" that represent the binary identifier of the light point device.

Each camera 108 uses a spherical coordinate system $(r,\theta,\phi)$ while each of the CCDs 112 and 114 use a cylindrical coordinate system $(r,\theta,z)$. No translation is needed between these coordinates because the CCDs 112 and 114 measure only the coordinate $\theta$, which is common to both coordinate systems. The room coordinate system is the Cartesian coordinate system $(x,y,z)$.

FIG. 1 depicts the system as a whole. Plural light point devices 106 in a module 102 provide light 104, preferably red or infrared light. Each light point device 106 provides a unique pulse code representing the binary identifier of the light point device 106. Each of the cameras 108 is the same, although they are mounted in different positions, e.g., as depicted in FIG. 2.

FIG. 2 depicts the capture volume, i.e., the volume in which motion can be captured, as a CYL section 202. The capture volume 202 is, e.g., 16 feet in diameter and extends eight feet above the floor 204. Despite the large size of the capture volume 202, the MC system of the invention can capture hand gestures and facial expressions.

The cameras 108 are mounted on the walls of a room and are oriented at a predetermined angle of approximately 45° to the floor 204 or walls. Each camera subtends an angle of approximately 30°. The cameras need not be mounted at the same height on each wall, as depicted by the differing heights or points 206 and 208 depicted in FIG. 2. At 30 feet from a camera having a 30° field of view, and assuming ¼ sub-pixel resolution the camera has a resolution of 0.024 inch=30 ft*(2*tan 15)*12 inches/ft/(2048*4).

Light from the light point devices 106 is focused by the optical system 110 (to be discussed in more detail below) onto the detectors, or linear CCDs, 112 and 114. The brightness of the images will depend upon the distance from the camera, the direction that the light point device is oriented relative to the camera, and the idiosyncratic nature of the light point device itself.

The timing of the pulses from the light point devices 106 is determined by a synchronization (synch) signal from the controller 134 that is transmitted via the RF transmitter (TX) 140 to the light point devices; the operation of the light point devices will be discussed in more detail below in connection with operation of FIG. 3. These same synch signals transmitted by the RF TX 40 are also provided to the cameras 108 via the synch signal path 142. The preferred frame rate is near or above 300 Hz, e.g., 296 Hz, so a regular synch signal is provided every 1/296 of a second. It is preferred not to use a frame rate that is a multiple of 60 in order to reduce 60 Hz noise artifacts, e.g., problems with background lighting.

Alternatively, the light point devices could be modulated at a slower rate than the frame rate. For example, the light point devices could be modulated at 118 Hz with a frame rate of 354 Hz. In this alternative, the amplitudes of the light point devices would stay constant for 3 frames. This might be necessary in a situation in which there is a tendency to have, e.g., 50 light point devices imaged in a range of 200 pixels.

Figure 12:
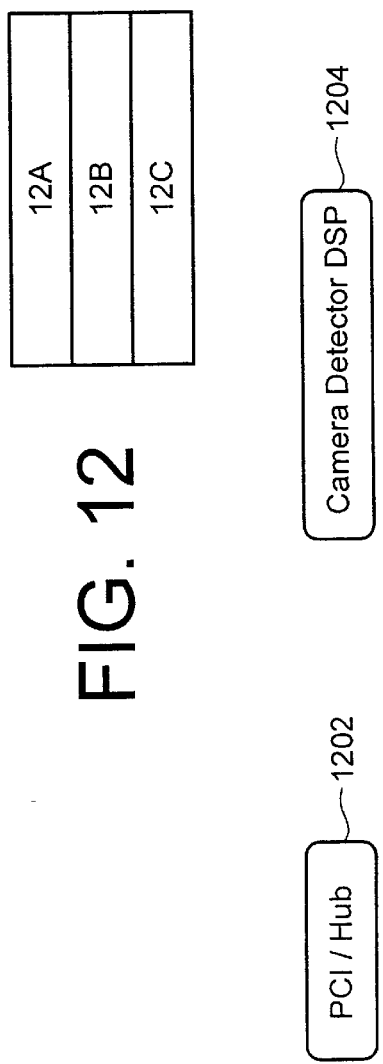
FIG. 12 is a flow chart depicting the processing carried out to recognize images on a CCD corresponding to light point devices, according to the invention.
Figure 12A:
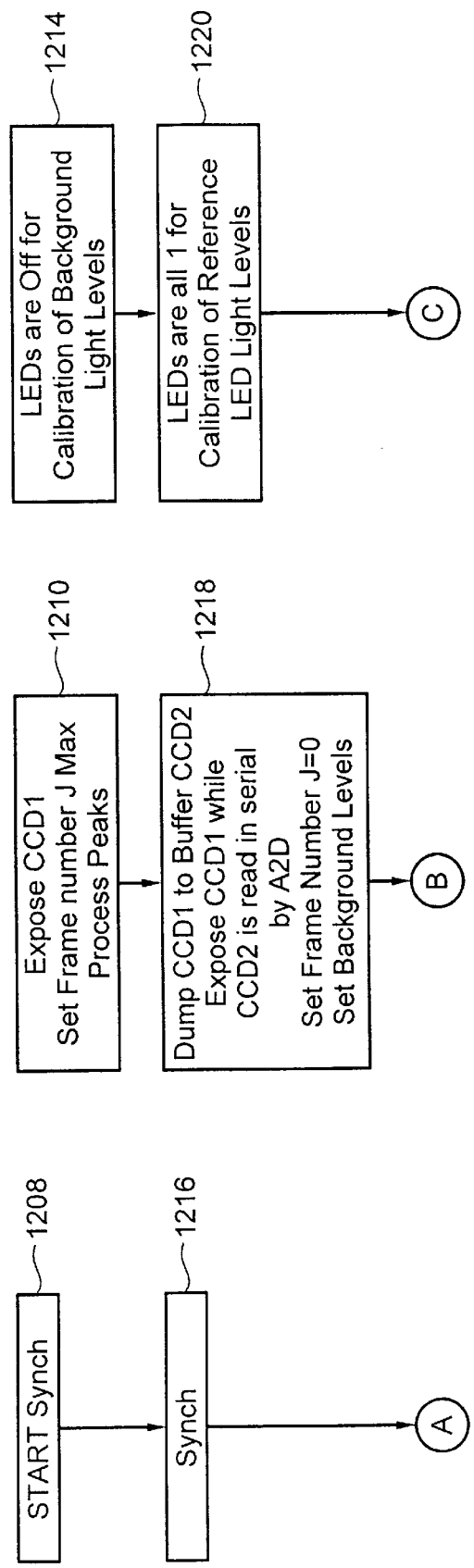
Figure 12B:
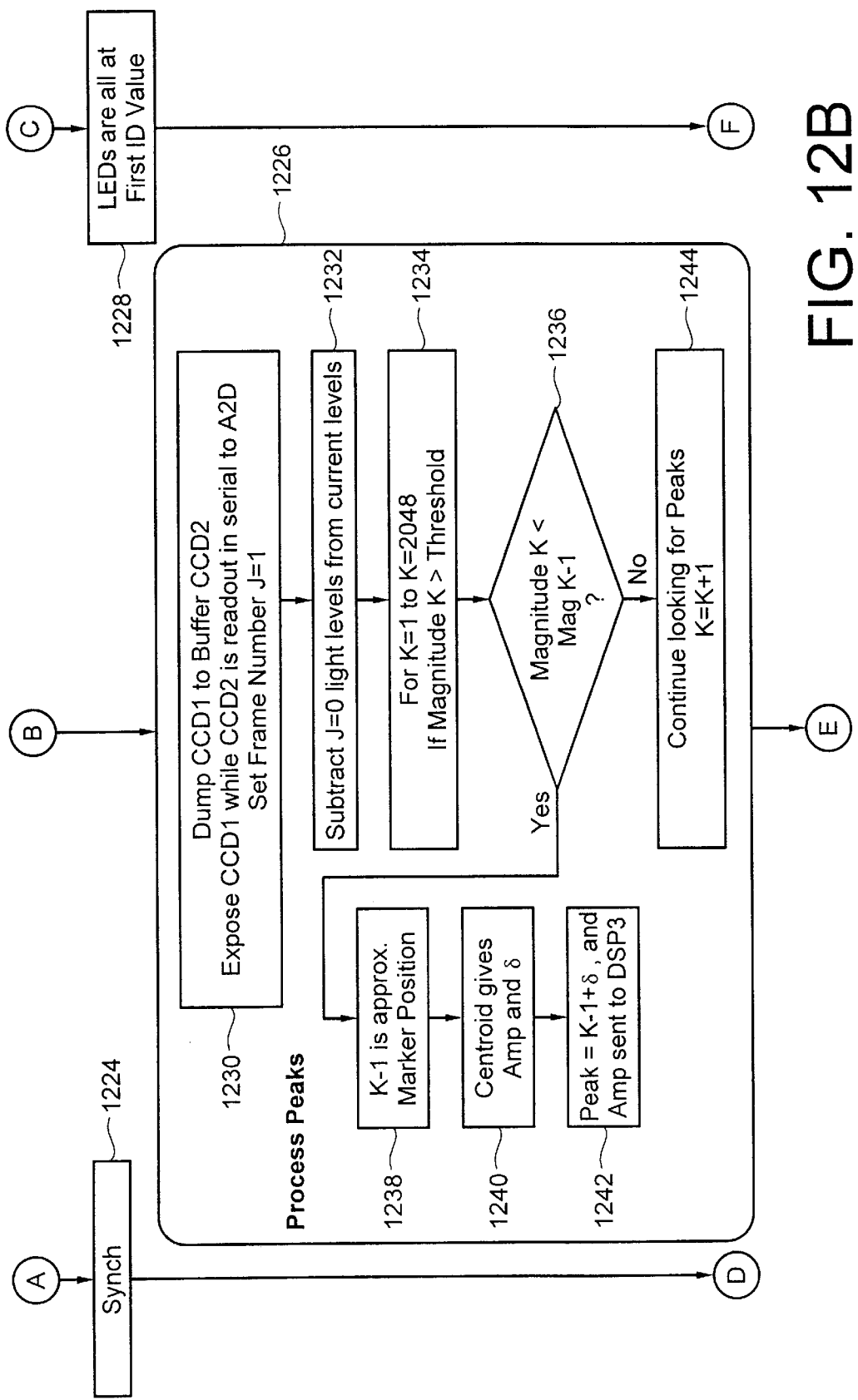
Figure 12C:
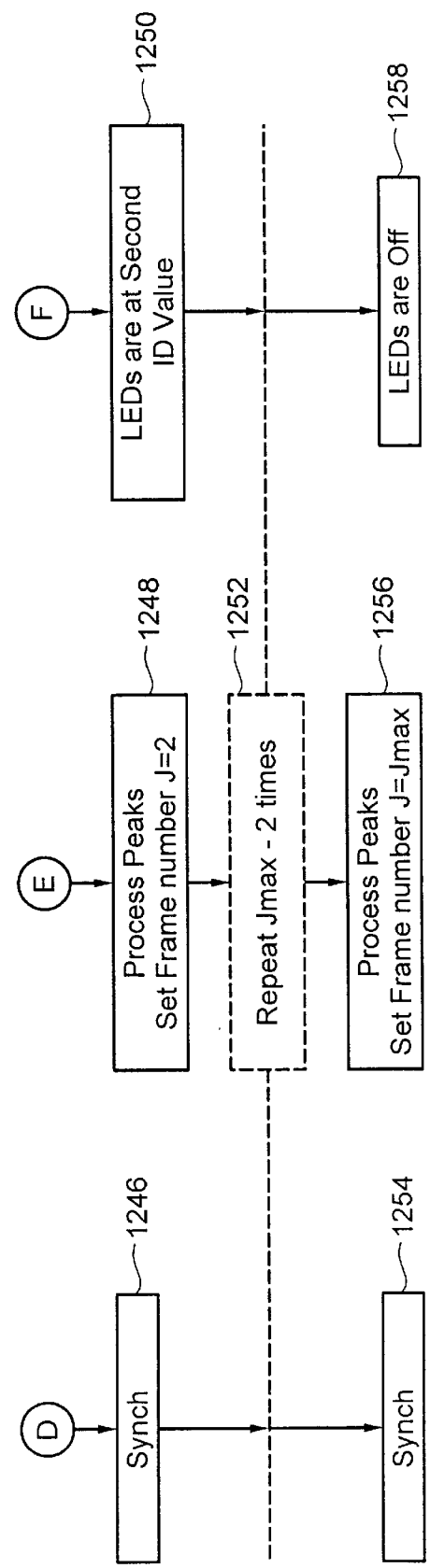

The CCDs preferably each have 2048 pixels and one tap to drain the CCD. Alternatively, the CCDs 116 and 118 could have two taps, or each could be implemented with two separate CCDs to increase the rate at which the locations of imaged data point devices is determined. As the CCDs 112 and 114 in each camera 108 are perpendicular, the camera has an effective resolution of 2048×2048, without taking into consideration sub-pixel resolution. The centroid calculation of FIG. 12 is preferably included to achieve sub-pixel resolution. Assuming the centroid calculation can increase the resolution by a factor of between 4 and 10, then the effective resolution is between 8192×8192 and 20,480×20,480.

The typical optical motion capture systems cannot provide real-time performance using cameras having a resolution of 1280×800, so how can the motion capture system of the invention provide real-time performance given that it is an optically-based system having much greater resolution? The key is that the typical optical system fails to recognize that determination of position can be broken down into independent one-dimensional position determinations prior to a three-dimensional triangulation, i.e., 3D position determination.

By having a DSP for each of the CCDs 112 and 114, the motion capture system of the invention greatly reduces the computational load on a single processor. These separate DSPs can run in parallel because the one-dimensional position determinations are based on independent data. Moreover, the DSPs 126 and 128 drastically reduce the bandwidth of the data coming from the CCDs 112 an 114 because they only pass along data concerning imaged light point devices. Even if all 128 light point devices were imaged on, e.g., CCD 112, DSP 126 would only transfer a fraction, 128/2048, of the data output by the CCD 112, which represents, at worst, a 94% reduction in the bandwidth that must be accommodated. It is rare that even half of the 128 light point devices would be imaged at once because half are expected to be on the front of a subject and half are expected to be on the back.

The exploitation of computational independence carries over to the third DSP, namely DSP 130, in each camera 108. It maintains a history of positions, velocities, accelerations and jerk values for each imaged light point device from the CCDs 112 and 114. It also attempts to identify the identifier ID of the imaged light point devices being tracked. Assigning one DSP to each of CCDs 112 and 114 reduces the requisite array sizes such that the on-chip RAM (not shown) of the DSP is adequate, which increases the speed of the DSP by eliminating the need to access off-chip RAM.

Only when the DSP 130 is successful in identifying an ID of an imaged light point device will it send information to the controller 134. Such tending of imaged light point device histories and identification is independent of, but a necessary element of, the three dimensional calculations of position.

By having the DSP 130 tender historical data and identify light points, this further reduces the computational load on the processor responsible for the 3D calculations and further reduces the bandwidth of data ultimately being sent to the 3D processor. The distributed processing of the DSPs 126, 128 and 130, and the controller 134, make motion capture system of the invention modular such that it can be scaled, e.g., in terms of the number of light point devices 106 being tracked, without significant reductions in performance.

During normal operation, upon receipt of a regular synch signal indicating the start of frame S, e.g., SYNCH(S), the CCDs 112 and 114 perform a parallel transfer of their charge, corresponding to the just-ended frame S−1, to the CCDs 116 and 118, respectively, which are covered so as not to be energized by incident light. During the frame S, i.e., prior to the next regular synch signal, e.g., SYNCH(S+1), the CCDs 116 and 118 serially shift their charges (corresponding to frame S−1) out to the analog to digital (A/D) converters 120 and 124, which provide a binary representation of the charges to the digital signal processors (DSPs) 126 and 128, respectively. The DSPs 126 and 128 provide the timing signals for this serial shift via the synch signal paths 152 and 154, respectively.

After the CCDs 116 and 118 shift their charges to the DSPs 126 and 128 via the A/D's 120 and 124, respectively, and prior to the next regular synch signal SYNCH(S+1), the DSPs 126 and 128 determine the positions of the images of the light point devices along the CCDs for the frame S−1, which is indicative of the position of the light point device along the corresponding reference axis. The determination of the position, of an image (or marker) corresponding to a light point device, along the CCD will be discussed in more detail below in connection with FIG. 12. Also, the determination of the three-dimensional position of a light point device will be discussed in more detail below in connection with FIG. 18.

For each frame, the DSPs 126 and 128 provide data packets via the FIFOs 144 and 146, respectively, to the DSP 130 for each imaged light point device, i.e., each marker. Each such data packet has a position field and an amplitude field, e.g., as depicted in FIG. 14A, which preferably is 18 bits in size. The DSP 130 tracks the markers over a sufficient number of frames to determine the identifier of the light point device corresponding to each tracked marker.

It is possible, after an initial number of frames have elapsed, for the DSP 130 to confirm the identifier of the tracked marker with each new data frame. That is, with each additional ambient frame and signature frame (both to be discussed below), no new identifications can be made. However, new identifications are possible with each of the other seven frames in a cycle.

Each time that the DSP 130 determines the light point device identifier of a tracked marker, the DSP 130 provides an identifier data packet to the controller 134 via a serial port (not shown) on the DSP 130 at a rate, e.g., of 625 KHz in 8 bit units. Such a data packet is depicted, e.g., in FIG. 14D, and contains the identification (ID) of the light point device, the identifier of the camera of which the DSP 130 is a part, the axis corresponding to the detector or CCD along which the light point device was imaged and the position of the light point device along the axis. The controller, e.g, restructures the 8 bit units into 32 bit words.

Such a data packet preferably includes an indication of the quality of, or the confidence in, the identification, as depicted, e.g., in FIG. 14E. The determination of the identifier of a light point device corresponding to a tracked marker will discussed in more detail below in connection with FIG. 13.

The controller 134 (the operation of which will be discussed in more detail below is a programmed processor, e.g., a DSP, that collects the data packets from the cameras 108 and tabulates the data. The controller selects the best data for each identified light point device and sends the data to the controller 134 which determines the three-dimensional (3D) data based upon the selected data.

Because of the data selection process performed by the controller 134, the MC system of the invention can be configured with many different numbers of cameras. Eight has been indicated as the preferred number of cameras because the commercially available competitive systems typically can accommodate connections of up to eight cameras. Adding more cameras to the system merely would increase the amount of data being tabulated prior to the 3D calculation, but would not affect the subsequent 3D calculation. More cameras and more controllers would be added increasing the available processing power, scaling to the configuration, but only three CCDs are required to provide 3D information.

The controller 134, e.g., including a DSP, determines the 3D position of a light point device 106 and then tracks the motion of that light point device. To filter out data points that appear as though they might be spurious, the controller 134 will predict the track of the light point device 106 in question without using the possibly spurious data point, and compare the predicted track to the actual track. If they do not compare, then the data point is considered spurious, is discarded and is replaced by the corresponding predicted point.

The programs executed by the DSPs 126, 128 and 130 preferably are stored in, e.g., RAM (not depicted, but incorporated into each DSP) so that they can easily be modified to accommodate different MC tasks, e.g., involving different numbers of light point devices (requiring greater or fewer numbers of bits in the identifier code (ID) and different ambient light levels (requiring more or less ambient light sampling). The controller 134 or PCI Card 136 transfers the operating programs of the DSPs 126, 128 and 130 to the DSP 130 via the bidirectional signal path 146. The DSP 130 transfers the operating programs of the DSPs 126 and 128 to the DSPs 126 and 128 via the bidirectional signal paths 148 and 150, respectively.

The controller 134 also handles the registration of the cameras. Although each camera's position in the coordinate reference system is known, there will be a certain amount of inconsistency between the cameras that cannot be eliminated. The controller 134 filters, or registers, these inconsistencies between the cameras so that, e.g., at hand-off, namely the time at which a marker is passed from one camera's field of view into another's, the path of the tracked light point device will not appear discontinuous.

The controller 134 provides 3D data to the personal computer (PC) 138. The PC 138 displays the data at the standard display rate of 30 frames per second, e.g., in the form of a wire frame figure, to provide the real-time feed back needed to determine whether the desired motion has been captured sufficiently. In addition, the PC 138 calculates rotational data to view the wire frame figure at different angles, builds a database of connectivity, formats the 3D data according to the requirements of a given rendering software package, and outputs and/or stores (e.g., to a hard disk) the formatted data.

The distribution of functional responsibilities between the controller 134 and the controller 134 reflects the goal of distributing the processing as much as possible. Alternatively, the functions performed by the controller 134 and the controller 134 could be combined or allotted differently, assuming that enough processing power were available to ensure adequate performance.

Operation of FIG. 3

The light module 102 of FIG. 1 is depicted in greater detail in FIG. 3. The radio frequency receiver (RF RX) 302 receives synch pulses from RF TX 140 and provides them to the processor 300. The processor 300 modulates in both amplitude and duration the active light point devices 106, e.g., the LEDs 306, 310, and 310, via the amplifier circuits 304, 308 and 312. The processor uses precalibrated timing offsets to overcome delays associated with the synch signal being sent and received. The light module, e.g., has a local 10 MHz clock (not depicted) that is synchronized to the 300 Hz synch pulses from the controller 134.

The system preferably uses up to 128 light point devices 106, i.e., up to four times as many as the typical MC system. A seven bit binary word is sufficient to represent 128 identifiers, so the processor 300 must control each light point device to repetitively transmit its unique 7 bit binary identifier (ID). The processor stores the identifiers of the LEDs 306, 310 and 314 preferably in an EEPROM, so that the identifiers of the LEDs 306, 310 and 314 can be rewritten, e.g., by a master device (not shown) via a specialized communication path (not shown) with the processor 300 or by the controller 134 via the RF TX 140 and RF RX 302, or by a switch or switches.

The modulation frequency of the light point devices 106 is set sufficiently greater than the frame rate of the cameras so that the cameras 108 act as integrating devices. As such, the cameras 108 only detect the sum of the photons from the light point devices 106 during a frame, i.e., period of exposure. Therefore, the modulation scheme used to drive the LEDs 306, 310 and 314 can be amplitude modulation, frequency modulation or a combination thereof. That is, the amplitude is varied by changing the duty cycle or by changing the pulse width.

The important result of the modulation scheme is that a light point device 106 be able to deliver a controllable amount of photons in a frame. This permits the CCDs 112 and 114 to detect either 2X photons or X photons, i.e., a 2X or X brightness, corresponding to a binary logic "1" pulse and a binary logic "0" pulse, respectively. Thus, the current supplied to the LEDs 306, 310 and 314 is kept constant, while the elapsed time during which the current gets supplied is either 2T or T, respectively, assuming that the power dissipation of each LED does not vary its output.

Alternatively, if the power input/output characteristic of each LED were known, then the processor 300 could selectively drive each LED to produce an output level corresponding to a binary logic "1" pulse and a binary logic "0" pulse.

The output of each light point device 106 will vary somewhat. To recognize an identifier, the MC system of the invention must be able to recognize when a light point device has provided a either a binary logic "1" pulse or binary logic "0" pulse. Thus, the MC system of the invention calibrates each light point device 106 by imaging a frame in which every light point device is controlled to provide a "1" pulse by the controller 300. Alternatively, every light pulse could provide a "0" pulse rather then a "1" pulse, which saves power.

Preferably, this signature frame is the second frame, namely F1, in the cycle of frames that includes the 7 bit ID. By providing a signature frame every cycle, the MC system of the invention can adapt to changes in position and orientation of the light point device.

Balancing the exposure, i.e., frame, time with the amount of current used to drive the light point device can optimize the signal/pulse to noise ratio. As an example, if the pulse level is 10 and a background noise level is 100 on an arbitrary scale with a variance of 10%, there is a possibility that a pulse would get lost in the noise. Suppose the detector exposure, time is decreased by a factor of two while the brightness of the light point device is increased by a factor of two. The total output power of the source will have remained constant but the noise is now 50±5 though the pulse level remains at 10. Now suppose the exposure time is decreased to 1/10 of the original exposure time while the light point device (assuming output linearity) is driven with ten times the current magnitude of the original current. The pulse level remains at 10 while the noise level has been reduced to 10±1.

As alluded to above, the invention preferably lumps the CCDs 112 and 114 to the CCDs 116 and 118 after half of the frame time has elapsed, i.e., at ½ $T_F$. During the second half of the frame time, the light points 106 are turned off so that they can cool off. If the light points could be driven at a lower level, they could run cooler, and less time could be sacrificed to cooling off the light points.

The MC system of the invention deals with ambient light in the room in which is located the capture volume 202 by subtracting the ambient light from the value measured at each pixel by the CCDs 112 and 114. To do so, the MC system of the invention images a frame in which none of the light point devices 106 provide light. Preferably, the ambient-light-only frame is the first frame, namely F0, in the cycle of frames that includes the 7 bit ID. Thus, the cycle is nine frames, one for the ambient light, one for the "1" signature, and seven for the identifier codes to be transmitted.

The module 102 is preferably battery driven. The RF RX, processor 300 and amplifier circuits 304 of the module 102 should be housed in a structure that preferably is no larger than a typical pager/beeper. Such a housing would be worn by the subject, with the cables for the LEDs 306, 310 and 314 extending from it.

Alternatively, the light point devices 106 could be passive reflectors controlled to change their reflectivity so as to provide a reflected amount of light representing a binary logic "1" pulse or a binary logic "0" pulse.

Alternatively, the ambient light frame could be provided more or less often depending upon whether the room had a very uniform ambient light distribution, e.g., no bright spots such as a window or table lamp, or heterogenous light distribution. Similarly, the signature light frame could be provided more or less often depending upon the quality of the motion of the light point devices 106, e.g., the track of the light point devices 106 is continuous and the speed is slow, or the track is discontinuous and the speed is great.

Alternatively, the lights could be modulated to more than two levels, e.g., four binary logic levels so that the 256 IDs could be represented by four bits.

Operation of FIG. 4

FIG. 4 illustrates a unit sensor 400 defined by the two basic sensing components of the cameras 108 of FIG. 1, namely a plano-convex cylindrical (CYL) lens 404 and a linear, or one-dimensional array, CCD 402 having pixels $Pix_0$ to $Pix_{N-1}$, where N is preferably 2048. The CYL lens 404. e.g., corresponds to the lenses 508A and 508B of FIG. 5. The optical axis W of the CYL lens 404 is coplaner with the planar surface of the CYL lens 404 and oriented parallel to the Y axis of the coordinate reference system (CRS).

Light 104 from a light point device 106 impinges upon the convex surface of the CYL lens 404 and is transmitted therethrough and impinges upon one of the pixels Pixp of the CCD 402. The long dimension of the CCD 402 is aligned with the Z axis of the CRS while the short dimension is aligned with the Y axis, making the surface of the CCD 402 parallel to the planer surface of the CYL lens 404.

FIG. 12 Flowchart

FIG. 12 depicts operation of the light point device module 102, the CCDs 112–118, the A/Ds 124 and 126 and the DSPs 128 and 130. In particular, the DSPs 128 and 130 determine the position and amplitude of a light point device imaged or marked along the CCDs 112 and 114, respectively, in the manner depicted in FIG. 12.

Flow in FIG. 12 is depicted as occurring in three parallel columns, denoted the controller column 1202, the camera detector DSP column 1204 and the LED module 1206. At step 1208, the controller 134 provides a start synchronization (synch) pulse. The DSPs 126 and 128 recognize the start synch signal as such because it is a synch signal that follows a reset. In response to step 1208, at step 1210, the CCDs 112 and 114, referred to generally as CCD 1 in FIG. 12, are exposed to light under the control of the DSPs 126 and 128. In response to step 1208, the DSPs 126 and 128 cause the CCDs 112 and 114 to discard their charges after the start synch signal of step 1208. Also in step 1210, the DSPs 126 and 128 each set a counter counting a variable J to the value $J_{max}$. In addition, during step 1210, the CCDs 126 and 128 process peaks (which will be described in more detail below in connection with step 1226) to the extent that there is idle time available.

Also, in response to the start synch signal of step 1208, the processor 300 of the light module 102 turns off the light point devices 106 so that light sensed by the CCDs 112 and 114 will be only the ambient light in the room. The processor 300 recognizes the synch signal of step 1208 as a start synch signal in a manner similar to that of the DSPs 126 and 128. For example, after a reset signal transmitted by the controller 134 to the processor 300 via the RF TX 140 and the RF RX 302, the processor 300 treats the next synch signal as a start synch signal.

In step 1216 of FIG. 12, another synch signal is provided to indicate the start of another frame. In response to the synch signal of step 1216, at step 1218, the DSPs 126 and 128 control the CCDs 112 and 114 to dump in parallel their charges to the CCDs 116 and 118. Also at step 1218, the DSPs 126 and 128 set the counter J to J=0. Then, the DSPs 116 and 128 control the CCDs 116 and 118 to serially shift their charges to the recirculating buffer registers 127 and 129 via the A/D convertors 120 and 124, respectively. Also during step 1218, DSPs 126 and 128 process peaks, e.g., as in step 1226 to the extent that there is idle time available in this frame.

Also in response to the synch signal at step 1216, the processor 300 controls the light point devices 106 to output a binary logic "numeral 1" pulse. Each light point device 106 has an idiosyncratic input/output transfer function. By controlling all of the light point devices 106 to module a binary logic "1" during the "signature" frame, the DSPs 126 and 128 can log the idiosyncratic brightness level for each light point device 106. During the recognition of IDs at step 1330 of FIG. 13 and during the post-processing of steps 1308 of FIG. 13, discussed below, the "signature" of a light point device becomes important.

The values stored in the buffer shift registers 127 and 129 correspond to the ambient light levels sensed during the previous frame, which is referred to as frame 0. Thus, while the CCDs 112 and 114 are accumulating a charge for the next frame, the CCDs 116 and 118 are outputting the charge of the current frame. The serial shift of the charges from the CCDs 116 and 118 introduces a delay in the data of approximately one frame time $T_F$.

At step 1224, another synch signal is provided, indicating the start of another frame. In response to the synch signal of step 1224, the processor 300 of the light module 102 controls the light point devices to modulate a light level corresponding to the first bit value in the ID of the respective light point devices. Also in response to the synch signal of step 1224, the DSPs 126 and 128 process peaks in step 1226.

Step 1226 includes the sub-steps 1230-1244, all of which take place during the time between the synch signal of step 1224 and the synch signal of step 1246. At step 1230, the CCDs 112 and 114 are dumped to the CCDs 116 and 118. Afterward, the CCDs 112 and 114 resume accumulation of charge. The DSPs 126 and 128 set the counter J to J=1. Then, the DSPs 126 and 128 control the CCDS 116 and 118 to serially shift their charge to the DSPs 126 and 128 via the A/D convertors 120 and 124, respectively. Concurrently and in step with the CCDs 116 and 118, the DSPs 126 and 128 cause the buffer registers to circulate and so provide the ambient light levels corresponding to the pixel values being sifted out of the CCDs 116 and 118. Then in step 1232, the DSPs 126 and 128 subtract the value provided by the buffer registers 127 and 129 from the pixel value shifted out of the CCDs 116 and 118, respectively. This shifting and corresponding subtraction operation is conducted for each of the 2048 pixels in the CCDs 116 and 118, i.e., for a count of K=1 to K=2048. The buffer registers 127 and 129 recirculate to maintain the ambient values for use with the subsequent frame s of data.

Figure 4A:
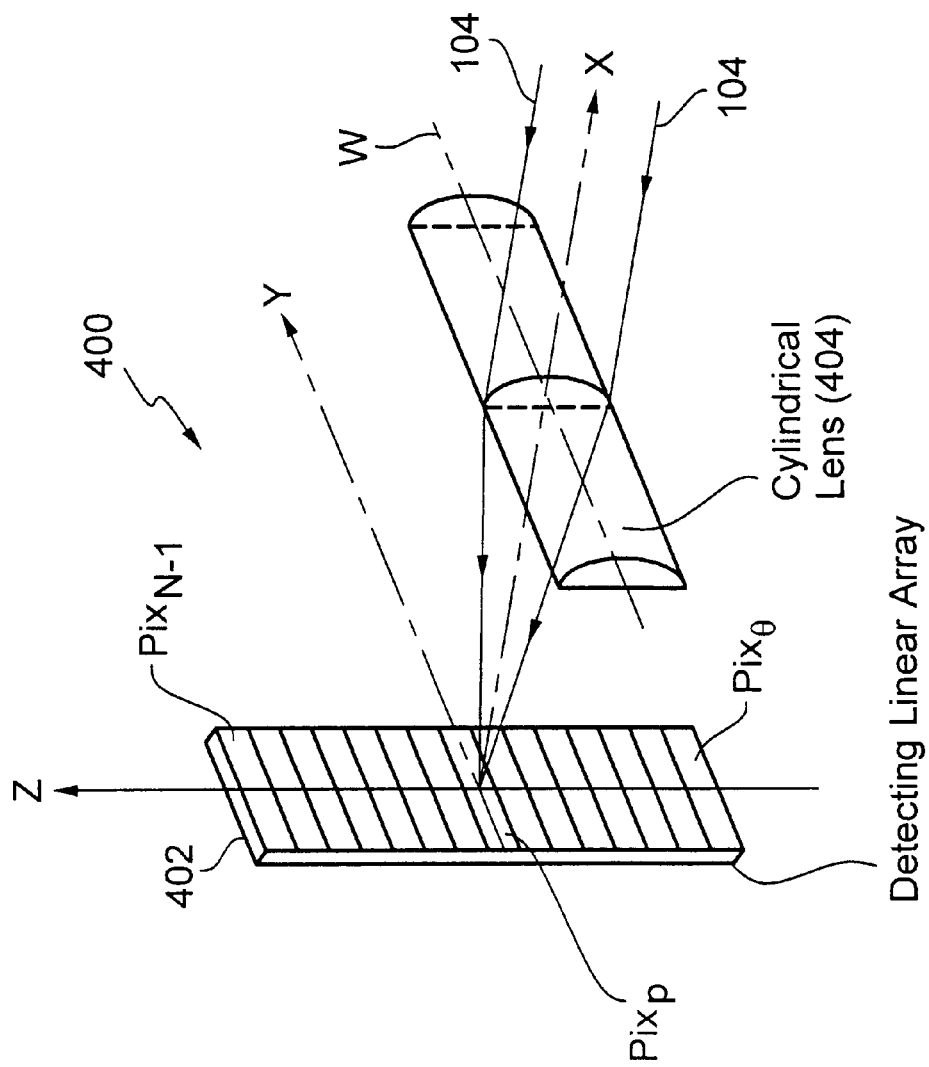
FIG. 4A illustrates the two basic sensing components included in the invention.
Figure 4A:
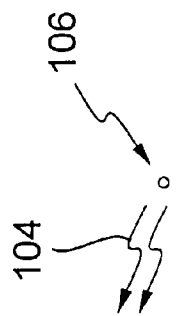
Figure 4B:
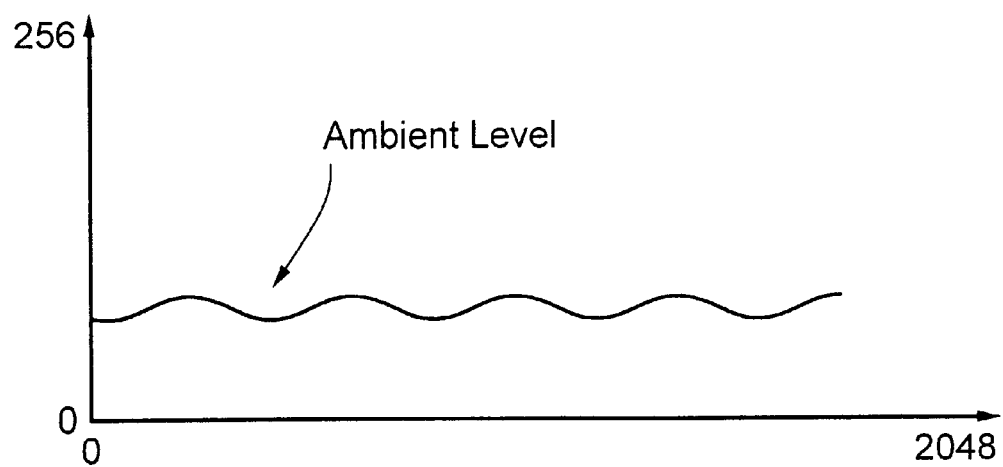
FIG. 4B is a waveform depicting an example of the ambient light sensed by the invention.
Figure 4C:
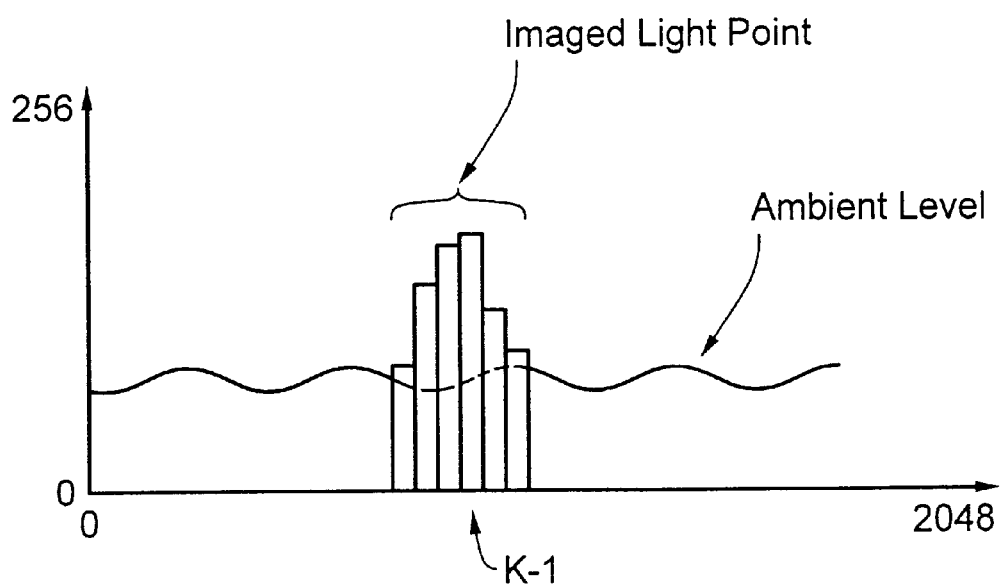
FIG. 4C is a waveform depicting the ambient light level upon which is superimposed the light of a light point device, as sensed by the invention.

The difference between the ambient light level and an imaged light point is illustrated by FIG. 4C. In FIG. 4B, only the ambient light level is depicted. In FIG. 4C, there is an image of a light point device superimposed on the abient light level.

At step 1234, the difference (or magnitude), between the value from the respective one of the CCDs 116 and 118 and the corresponding value of the respective one of the buffer registers 127 and 129 is compared against a threshold. This threshold is used to account for the variance in the ambient light level and thus is set according to that variance, which will depend upon the particular motion capture environment of a given application. If the DSPs 126 and 128 determine that the difference at pixel K, namely MAG(K) is greater than the threshold, then the DSPs 126 and 128 will consider this as the beginning of the image of a light point device on the respective one of the CCDs 116 and 118.

Then in step 1236, the DSPs 126 and 128 will determine the point device at which the magnitude of pixel K, namely MAG(k), is less than the magnitude of the preceding pixel, namely MAG(k−1). If the magnitude at pixel K is greater than the magnitude at pixel K−1, then the DSPs 126 and 128 will continue looking for the peak by examining the next pixel, namely K+1, as in step 1244. From step 1244, flow proceeds back to step 1234. However, if MAG(k)<MAG(k−1), then flow proceeds to step 1238, where the DSPs 126 and 128 recognize that pixel k−1 is the approximate position of a light point device. In optional but preferred step 1240, processing is carried out to achieve sup-pixel resolution. In step 1240, a well known centroid calculation is performed which determines a value δ as well as the amplitude of the light point device imaged at the sub-pixel k−1+δ.

The well known centroid calculation as applied to a Gaussian peak is summarized as follows: subtract background intensity from all pixels; compute a weighted sum of each pixel multiplied by the distance from the peak pixel; compute the sum of all the pixel magnitudes; divide the weighted sum by the sum of all pixel magnitudes; recognize the remainder δ of the division as the distance of the centroid from the peak pixel; treat the sum of all the pixel magnitudes as the amplitude at the sub-pixel position K−1+δ.

At step 1242, DSPs 126 and 128 output a data packet containing the sub-pixel position K−1+δ and the corresponding amplitude AMP, as depicted in FIG. 14A. DSP2 must complete the processing up through step 1242 within a time T=(1/296)(1/2048), for the system having a 300 Hz frame rate and a 2048 pixel CCD. From step 1242, flow proceeds back to step 1234, until the CCDs 116 and 118 have shifted out all of their charge. Again, this must occur before the next synch pulse at step 1246, otherwise any data left in the CCDs 116 and 118 are lost.

In step 1246, another synch pulse is received. In response to the synch pulse of step 1246, the DSPs 126 and 128 set the frame counter J to J=2 and process peaks in the manner described in connection with step 1226. Also in response to the synch signal of step 1246, the processor 300 controls the light point device devices to output the second bit of the respective IDs.

Step 1252 of FIG. 12 indicates that the processing described in terms of steps 1224, 1226 and 1228, or in terms of steps 1246, 1248 and 1250 are repeated several more times equal in number to $J_{max}$−2. Then in steps 1254, 1256 and 1258, the cycle of frames begun at steps 1208, 1210 and 1214 is repeated.

FIG. 13 Flowchart

Figure 13B:
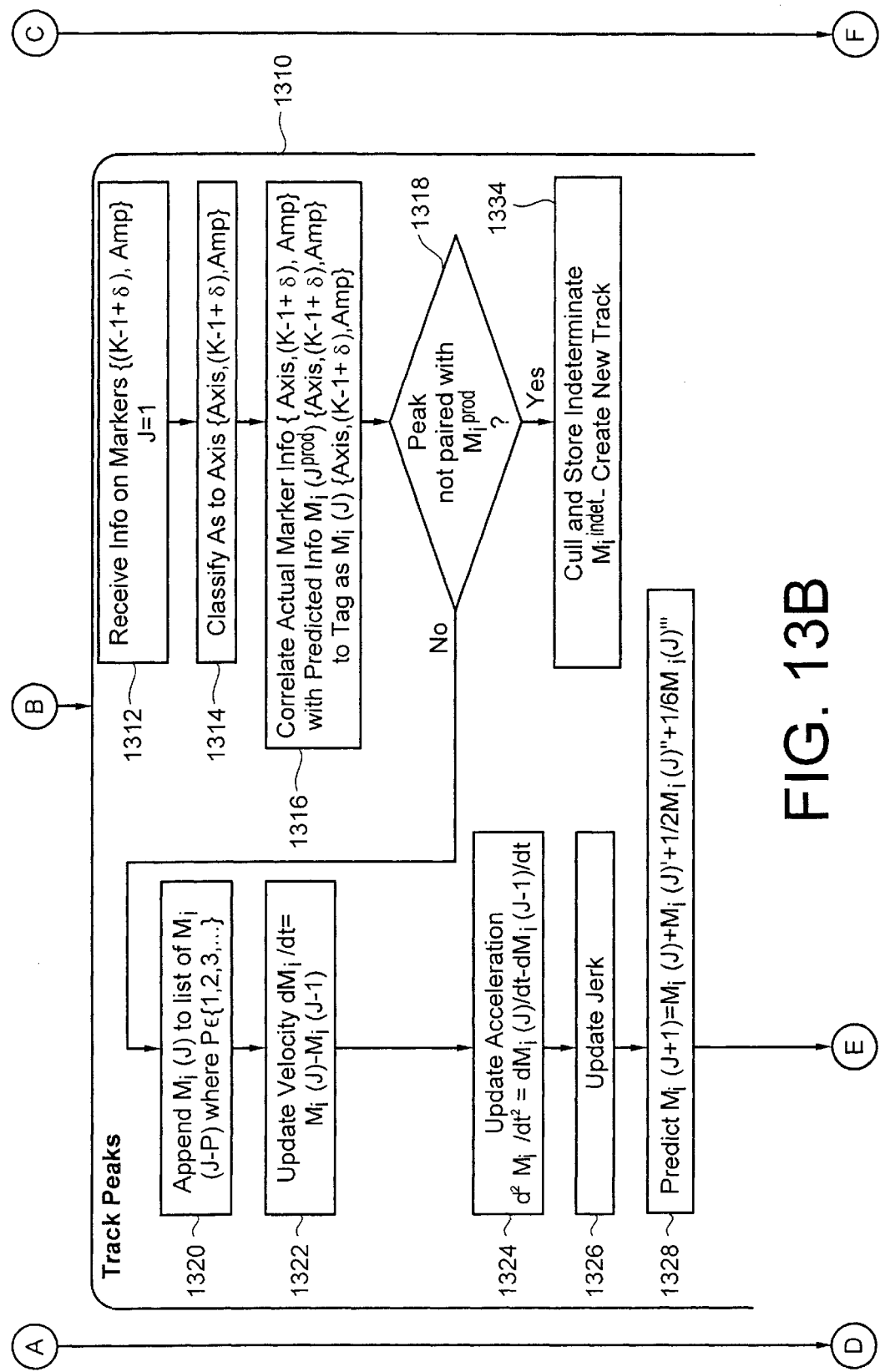
FIG. 13 is a flow chart depicting the processing carried out to track the images recognized by the flow chart of FIG. 12 according to the invention.
Figure 13C:
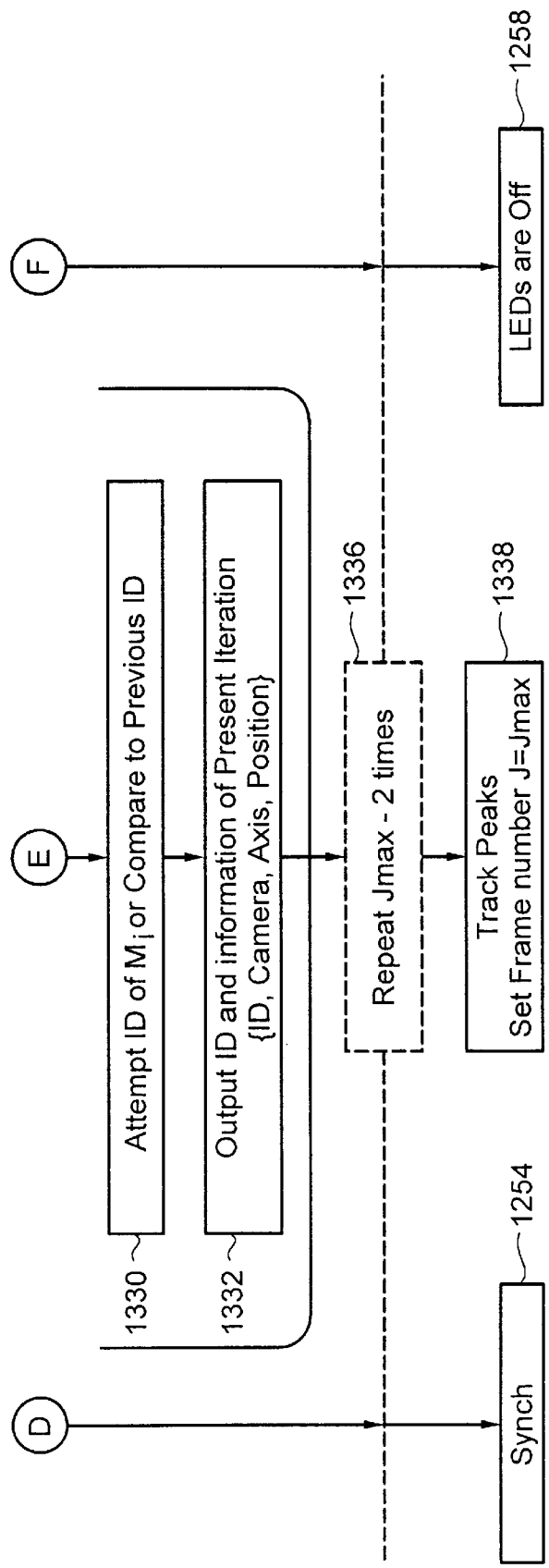

FIG. 13 depicts the manner in which the DSP 130 of FIG. 1 determines the identifier ID of marker data received from the DSPs 126 and 128. This determination involves correlating new data from the DSPS 126 and 128 with existing historical data, updating predictions concerning the markers for which historical data is available, predicting the next positions of the markers for which historical data is available, and attempting to recognize IDs of those markers which have a history spanning nine or more frames.

Flow in FIG. 13 is depicted as occurring in three parallel columns in the same manner as FIG. 12. The columns for the controller 1202 and the LED module 1206 are the same as in FIG. 12. This is to emphasize that the DSP 130 is conducting processing concurrently with the DSPs 126 and 128.

The processing of DSP3, i.e., DSP 130 of FIG. 1 is depicted under the column denoted by reference number 1302. In response to the start synch signal of step 1208, the DSP 130 processes the penultimate frame, namely frame $J_{max}-1$, in the preceding cycle of frames. Also in response to the start synch signal of step 1208, the LEDs are turned off in step 1214 by the processor 300. At step 1216, the next synch signal is received and, in response at step 1306, the DSP 130 processes the last frame, namely $J_{max}$, in the preceding cycle. In step 1220 in which the LEDs are set to modulate a binary "symbol 1" pulse, also in response to the synch signal of step 1216.

At the next synch pulse in step 1224, the DSP 130 performs post-processing of indeterminate markers, namely $M_i^{Indet}$. Such post-processing will be discussed in more detail below in connection with the example of FIG. 15. Post-processing takes place after the synch pulse of step 1224 because no data is provided from the DSPs 126 and 128 during this frame. Rather, during this frame, the DSPs 126 and 128 are determining the calibration values based upon the ambient or light levels.

At the next synch pulse received in step 1246, the DSP 130 carries out the peak tracking processing depicted in step 1310, which includes the sub-steps 1312–1334. The peak tracking of step 1310 takes place at the same time that the LEDs are modulated to the value of the bit in the second position of their respective IDs, as depicted in step 1250.

At step 1312, the DSP 130 receives, from the DSPs 126 and 128, marker data in the form of data packets containing a sub-pixel position and an amplitude, e.g., as depicted in FIG. 14A. At steps 1314, the DSP 130 classifies those markers as to the axis from which they were derived, i.e., according to whether this data came from CCD 112 or 114. The DSP 130 converts the data packet of FIG. 14A into a data packet having an axis field, a position field and an amplitude field, as depicted, e.g., in FIG. 14B.

From step 1314 of FIG. 13, flow proceeds to step 1316, where newly received and classified actual marker info is correlated with predicted marker info to pair up corresponding actual and predicted pairs and tag the paired-up data packets of FIG. 14B with a marker number, e.g., as in FIG. 14C. In step 1318, where it is determined whether there is any indeterminate information, namely {Axis,K−1+δ,Amp} data packets.

An indeterminate data packet is one that cannot be paired satisfactorily to any predicted marker position. Pairing is done by determining if only one light point device has been imaged within a predetermined distance (determined according to the velocity of the imaged light point device) of a predicted position for a marker about which historical information is available. For example, for a light point device moving at 100 miles per hour, the distance or window would be 70 pixels. If within the predetermined distance, then this imaged light point device is determined as corresponding to the marker.

If a data packet cannot be paired, this could be, e.g., because two light point devices have been imaged within the predetermined distance of the predicted marker position, or because the would-be imaged light point device is spurious information or because the imaged light point device corresponds to a previously obscured light point device for which there is not a corresponding predicted marker position. It is assumed that a spurious image will not appear at the same location as an actual image. The problem of prolonged period in which a light point device is obscured from one camera is ameliorated by the existence of other cameras in the system, at least two of which are likely to have the light point device in their fields of view.

If there is at least one indeterminate data packet at step 115 1318, then flow proceeds to step 1334, where the indeterminate data packet is labelled with a marker number, tagged as indeterminate, namely as $M_i^{Indet}$\{Axis,K−1+δ, Amp\}, and stored in the RAM of the DSP 130. From step 1334, flow proceeds to step 1320. Similarly, if there are no indeterminate data packets at step 1316, then flow also proceeds to step 1320, where the newly identified marker data $M_i(J)$ is stored in the RAM of the DSP 130 along with historical data corresponding to that marker, namely $M_i(J-P)$, where $P \in \{1,2,3, \ldots \}$.

From step 1320 of FIG. 13, flow proceeds to step 1322, where the velocity of each marker $M_i$ is updated and stored in the RAM of the DSP 130. Where the time steps, i.e., the frame times, are the same, the change in position of a marker from one frame to the next is taken as the approximation of velocity, i.e., $dM_i/dt=M_i'(J) \approx M_i(J)-M_i(J)$. If no marker position exists for the previous frame J−1, then the next most previous marker position is selected, e.g., J−2, J−3, etc.

From step 1322 of FIG. 13, flow proceeds to step 1324, where the acceleration of each marker $M_i$ is updated and stored in the RAM of the DSP 130. Again, where the time steps, i.e., the frame times, are the same, the change in velocity of a marker from one frame to the next is taken as the approximation of acceleration, i.e., $d^2M_i/dt^2=M_i''(J) \approx dM_i(J)/dt-dM_i(J-1)/dt$. As before, if no marker velocity exists for the previous frame J−1, then the next most previous marker velocity is selected, e.g., J−2, J−3, etc.

From step 1324 of FIG. 13, flow proceeds to step 1326, where the jerk of each marker $M_i$ is updated and stored in the RAM of the DSP 130. Again, where the time steps, i.e., the frame times, are the same, the change in acceleration of a marker from one frame to the next is taken as the approximation of jerk, i.e., $d^3(M_i)/dt^3=M_i'''(J) \approx d^2M_i(J)/dt^2-d^2M_i(J-1)/dt^2$. As before, if no marker acceleration exists for the previous frame J−1, then the next most previous marker acceleration is selected, e.g., J−2, J−3, etc.

Additional higher order derivatives could also be determined at this point in the processing by the DSP 130. However, with each successive frame the approximations converge to the actual values if the frame time is sufficiently small compared to the changes of the measured attributes, namely position, velocity, acceleration and jerk, over time.

From step 1326 of FIG. 13, flow proceeds to step 1328, where the next positions of the markers are predicted using the equation, $M_i^{Pred}(J+1) \approx M_i(J)+M_i'(J)*T+M_i''(J)*T^2+M_i'''(J)*T^3$, where T corresponds to one frame and therefore has a value of one. In addition, the next-next-next positions calculated, namely $M^{Pred}(Jt3)$. From step 1328, flow proceeds to step 1330, where the DSP 130 attempts to recognize an identifier ID. This can only happen if there are at least nine frames, i.e., one cycle, of historical data accumulated for the marker. If there is an insufficient number of frames, then no attempt at recognizing an ID is made for that particular marker.

From step 1330 of FIG. 13, flow proceeds to step 1332, where the predicted next-next-next positions $M^{Pred}_{(J+3)}$ for any newly recognized IDs are outputted to the controller 134 in the form of a data packet having an ID field, a camera number field, an axis field, and a position field, e.g., as depicted in FIG. 14D. Optionally and preferably, the DSP 130 only outputs an ID after two successive identifications.

The process of tracking and recognizing IDs, e.g., as represented by the steps 1312 through 1334, adds another frame of delay to data that has already been delayed by one frame time. When the data is output by the DSP 130 at step 1332, it is has been delayed by two frame times. The determination of a three-dimensional (3D) position, i.e., the triangulation, performed the controller 134 will add another delay of one frame time. By reporting the next-next-next predicted position, namely $M_i^{Pred}(J+3)$, rather than the two-frames delayed actual position, namely $M_i(J)$, the 3D position information calculated by the controller 134 will be real-time information when it is output.

Even if the next-next-next predicted position, namely $M_i^{pred}(J+3)$, were not reported, rather the two-frames delayed actual position, namely $M_i(J)$, was reported, the motion capture system of the invention would still be much faster than the typical motion capture system. Assuming for the sake of argument that a typical motion capture system could report data with only three frame times delay, and that the typical motion capture system used a 30 Hz frame rate, the typical delay is 0.10 second. In contrast, the motion capture system of the invention runs at a minimum of 296 Hz, so reporting data with only three frame times delay translates to a 0.01 second delay, which is one order of magnitude faster!

Optionally and preferably, the DSP 130 adds a quality field to the data packet, e.g., as in FIG. 14E. The quality field indicates how many successive frames have resulted in a recognized ID. For example, a value of three in the quality field would indicate that the ID had been recognized in frames J, J–1 and J–2.

Also optionally and preferably, the DSP 130 adds a guess field to the data packet, e.g., as depicted in FIG. 14F. The field indicates how many successive frames that resulted in a recognized ID were based upon a guess. For example, a value of two in the guess field would indicate that the recognitions of the ID in frames J and J–1 had been based in some way upon a guess. As further options, the DSP 130 could add fields or flags to the data packet that denote the type of guess that had been made.

It is preferred that the quality and guess fields be included in the data packet so that the controller 134 can use this information to assess which is the best of the tabulated data, as will be discussed in more detail below.

After step 1332 of FIG. 13, flow proceeds to step 1336, which indicates that steps 1246, 1310 and 1250 are repeated $J_{max}-2$ times for the remaining frames in the current cycle. During these subsequent iterations of step 1310, the LEDs at step 1250 will be correspondingly modulated according to the remaining bits in the IDs.

After the cycle of frames ends with the last iteration required by step 1336, the next synch pulse is provided at step 1254. In response to the synch pulse of step 1254, the DSP 130 sets the frame counter J to $J=J_{max}$ at step 1338 and the controller 300 correspondingly sets the light point device devices to be off at step 1258. Similar processing ensues.

Initially, no historical data has been stored in the RAM of the DSP 130. As such, the first time that info on a marker is received, it will be tagged as indeterminate at steps 1322 and 1324. If the post-processing mentioned in step 1314 of FIG. 13 fails to pair an indeterminate marker $M_i^{Indet}$ {Axis, K–1+ δ,Amp} with any historical data, which necessarily occurs the first time that marker data becomes available, then the DSP 130: treats the indeterminate marker $M_i^{Indet}$ as a light point device that is no longer obscured; removes the indeterminate tag; and assumes that the velocity, acceleration and jerk are zero, i.e., $M_i'(J)=M_i''(J)=M_i'''(J)=0$. Thus, at first, the velocity, acceleration and jerk approximations will be poor. However, after another three frames, these values begin to become accurate.

As noted above, the post-processing mentioned in step 1314 of FIG. 13 will be discussed in more detail below in connection with the example of FIG. 15.

Tracking Example of FIG. 15

FIG. 15 depicts an example of the tracking, i.e., accumulation of historical data carried out by the DSP 130 of FIG. 1. In FIG. 15, four different light point devices have been imaged over the course of sixteen frames, from frame M+0 to frame M+15.

In frames M+0 and M+10, no light point devices are imaged because this corresponds to frame J=0, i.e., the ambient frame in which all the light point devices 106 are controlled by the processor 300 in the light module 102 not to provide light. In frames M+1 and M+11, the processor 300 controls each light point device 106 to output a binary logic "1" pulse. The DSP 130 uses the data from frame J=1 as a signature of each light point device.

The DSP 130 can use the signature of two light point devices to distinguish between two indeterminate markers $M_i^{Indet}+M_{i+1}^{Indet}$. Several instances of two indeterminate markers are depicted in FIG. 15, e.g., where the image 1566 of the fourth light crosses the path of the image 1546 of the third light point device in Frame M+6, and similarly where images 1527 and 1567 are adjacent and where images 1571 and 1211 are adjacent.

The signature of the third imaged light point device in frame M+1 is a binary logic "1" pulse having a level of 120 on an arbitrary scale. The signature of the third imaged light point device in frame M+1 is a binary logic "1" pulse having a level of 80 on the same arbitrary scale. A binary logic level "0" will be half of the value of a "1", so a "0" for the third imaged light point device will be 60 while a "0" for the fourth imaged light point device will be 40.

In frame M+6, the imaged light point devices 1546 and 1566 both appear to be "0s". Assuming that the signature data for the two light point devices exists, the DSP 130 will check their signatures to determine if this can differentiate the two images. The amplitude of image 1546 is 60, while the amplitude of image 1566 is 40. Thus, the DSP 130 will associate image 1546 with the third light point device and image 1566 with the fourth light point device despite how close together the two images are in frame M+6.

If the signature data for the third and fourth light point devices had not been available at frame M+6, e.g., because one or both had been obscured during frame M+1, then the DSP 130 would retain these images as indeterminate markers until, e.g., signature data became available at frame M+10.

Another type of post-processing occurs where there is a missed image point device when one is expected. This is depicted, for example as a void 1504 in frame M+4 of FIG. 15. The DSP 130 will predict the image magnitude expected at frame M+4, and then compare this against the actual value in frame M+4, i.e., the corresponding frame in the next cycle. If they are sufficiently similar, then the DSP 130 will replace the void 1504 with the predicted image magnitude for that light point device in frame M+4.

FIG. 15 also is illustrative of the identifier ID broadcast by each light point device. For example, over frames M+2 through M+9, the second light point device provides images 1522 through 1529, corresponding to the identifier ID=00001111. For example, over frames M+2 through M+9, the first light point device provides images 1503 through 1509, corresponding to the identifier ID=11__1111. If historical data were available for the first light point device, then the DSP 130 would guess that the magnitude of void 1504 should have been a "1", and would provide a data packet to the controller 134 indicating that a guess had been made.

The post-processing of step 1314 is carried out in frame J=0 because this corresponds to the frame in which ambient light is sensed. No identifications can be made by the DSPs 126 and 128 during the frame J=0 because no new data is available. Hence, no information is sent from the DSPs 126 and 128 to the DSP 130 during the frame J=0. This frees the DSP 130 to conduct the post processing.

Operation of FIG. 16

FIG. 16 depicts two unit sensors 1602 and 1608 in a camera 1600 and how they together can define a line in space along which is located an imaged light point device. The camera 1600 is analogous to the camera 108 of FIG. 1. For ease of illustration, FIG. 16 depicts the situation in which only one light point device 106 has been imaged by the camera 1600.

The light point device 106 is imaged at pixel 1614 in unit sensor 1602. The pixel 1614, in combination with the optical axis of the plano-convex lens 1604 define a first plane P1. The light point device 106 is also imaged at pixel 1618 in unit sensor 1608. The pixel 1618, in combination with the optical axis of the plano-convex lens 1610 define a second plane P2, orthogonal to plane P1.

The intersection of planes P1 and P2 define a line L along which is located the imaged light point device 106. A disadvantage of an optically-based system is that range cannot be determined with only one camera. To locate the position of the light point device 106 along line L, i.e., the range, it is necessary to find the intersection of a plane P3, from another camera 1600 in the motion capture system of the invention, with the line L.

The mathematics of such triangulation is well known, for example as disclosed in U.S. Pat. No. 4,193,689 to Reymond et. al., having a patent date of Mar. 18, 1980, and U.S. Pat. No. 4,039,825 to Doyle, having a patent date of Aug. 2, 1977, the entirety of each of which is hereby incorporated by reference. Because the mathematics of such triangulation is well known, only a brief discussion of the mathematics has been be provided.

Any other camera in the motion capture system of the invention will provide a plane P3 to triangulate the location of the light point device, but some cameras will would be a better choice than others. Ideally, the second camera chosen should provide a plane P3 that is as close to orthogonal with line L as possible. This circumstance is depicted in FIGS. 17A and 17B.

Orthogonality Example of FIG. 15

Figure 17A:
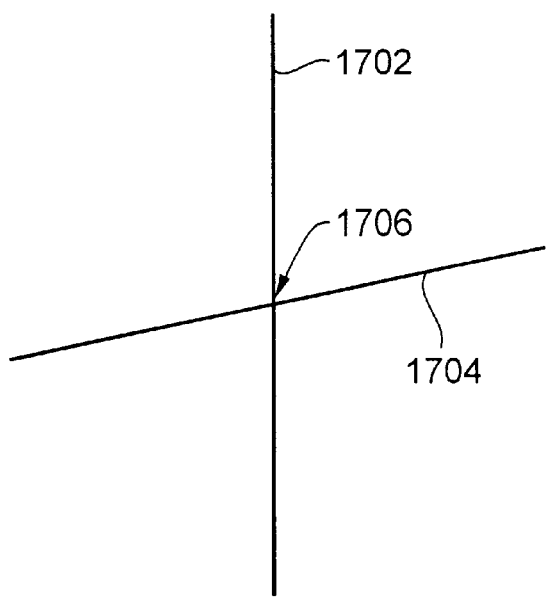
FIG. 17A and 17B depict contrasting examples of the effect of orthogonality on the intersection of a line and a plane.
Figure 17B:
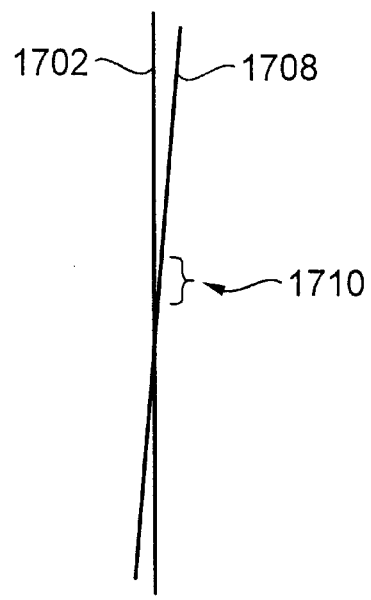

FIGS. 17A and 17B depict the effect of orthogonality on the intersection of a line and a plane.

In FIG. 17A, there is depicted a line 1702, corresponding to line L, and a plane 1704 extending out of the plane of the page. The point 1706 of intersection is easy to discern because the line 1702 and the plane 1704 are nearly orthogonal. In FIG. 17B, the line 1702 is depicted as intersecting with a plane 1708, again extending out of the page. The point 1710 of intersection is not easy to discern, i.e., it is blurred, because the line 1702 and the plane 1708 are much more parallel than they are orthogonal. Thus, the controller 134 will select a camera that is the most orthogonal with the camera by which line L was defined, assuming that the quality of the most orthogonal camera is acceptable.

FIG. 18 Flowchart

Figure 18:
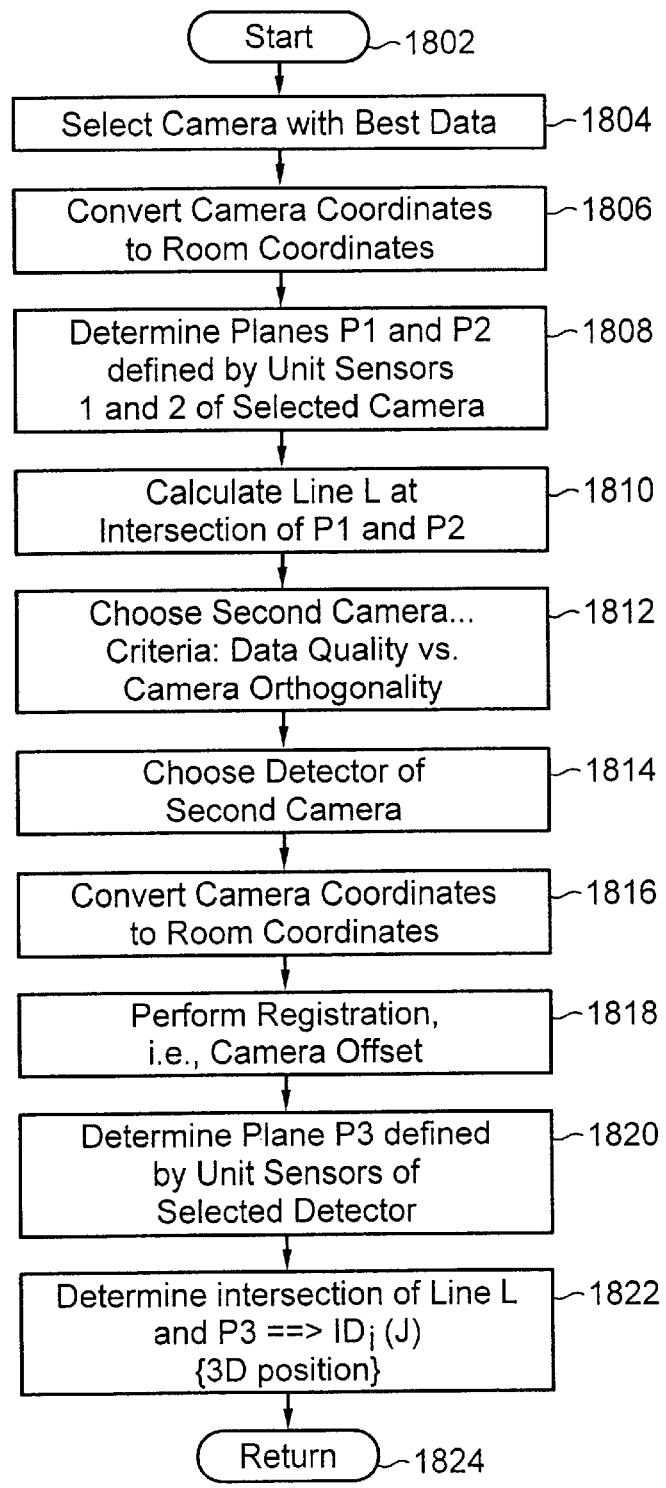
FIG. 18 is a flow chart of the processing carried out to triangulate the three-dimensional location of a point according to the invention.

FIG. 18 is a flowchart depicting the triangulation processing performed by controller 134 to determine the location of an imaged light point device in three-dimensional (3D) space. FIG. 18 actually represents a subroutine called by the controller 134 at step 2006 of FIG. 20A.

Flow starts in FIG. 18 at step 1802 and proceeds to step 1804, where a camera having the best data for a given identifier $ID_i$ is selected. As mentioned above, the controller 134 tabulates the data from the DSP 130 in each of the cameras 108 to monitor which light point devices, i.e, identifiers ID, have data for which a triangulation can be performed. The controller 134 can either complete the table or partially complete it to the extent that two cameras are available for each identifier ID. Such a table is depicted in FIG. 19.

Table of FIG. 19

FIG. 19 is an example of a table constructed by the controller 134 in response to the data packets that it receives from the DSP 130 in each of the cameras 108. The table in FIG. 19 has a column for the number of the camera, a column for the axis along which is oriented the CCD producing the data (e.g., oriented in the X direction or the Y direction of the coordinate reference system), and columns for each of the IDs from $ID_0$ to $ID_{H-1}$.

As an example, suppose CCD 112 of FIG. 1 is oriented along the X axis, is located in the second camera of the system, and has imaged light point devices $ID_2$ and $ID_{H-1}$. The third row of the table in FIG. 19 lists the camera number as 1 (the first camera being assigned number zero), the axis as being X, the identifiers $ID_0$ and $ID_1$ as "NO" (i.e., as not having been imaged), and the identifiers $D_2$ and $ID_{H-1}$ as "YES".

With each successive frame, the controller updates the table, either by recreating it or by modifying those entries that have changed since the last frame.

FIG. 18 Flowchart Cont'd

Continuing with the discussion of FIG. 18, it is to be recalled that the data received by the controller 134 is preferably in the form depicted in FIG. 14F, i.e., the data packets include a quality field and a guess field. Assuming that more than two cameras have provided data for an identifier ID, then the controller 134 selects a camera in step 1804 of FIG. 18 based upon the quality and guess information. In addition, if other considerations are not dispositive, the controller 134 will select a camera whose data is from the center of a CCD rather than a camera whose data is from the end of a CCD.

From step 1804 of FIG. 18, flow proceeds to step 1806, where the controller converts the coordinates of the selected camera to the coordinates of the room. From step 1806, flow proceeds to step 1808, where the controller 134 determines the planes P1 and P2 defined by the CCDs 112 and 114 and the imaged light point device. From step 1808, flow proceeds to step 1810, where the controller determines the line L defined by the intersection of the planes P1 and P2 from the selected camera.

From step 1810 of FIG. 18, flow proceeds to step 1812, where the controller 134 chooses a second camera for the imaged point device. The criteria balanced by the selection process are the quality of the data available and the orthogonality of the second camera with respect to the first camera. The orthogonality relationships between the cameras has been prestored in the RAM of the controller 134. From step 1812, flow proceeds to step 1814, where the one of the two axes of the second camera is selected.

From step 1814 of FIG. 18, flow proceeds to step 1816, where the coordinates of the second camera are converted to room coordinates. From step 1816, flow proceeds to step 1818, where the controller performs a registration, i.e., it provides an offset to the data of the second camera so that it is completely compatible with the data from the first camera.

From step 1818, flow in FIG. 18 proceeds to step 1820, where the controller 134 determines the plane P3 defined by the selected axis of the second camera and the imaged light point device. From step 1820, flow proceeds to step 1822, where the controller determines the intersection of the line L and the plane P3 and provides this as the 3D location of the imaged point device, namely $ID_i(J)$ {3D position}. From step 1822, flow proceeds to step 1824, where flow in the subroutine of FIG. 18 is returned to the calling step 2004 of FIG. 20A.

Figure 20A:
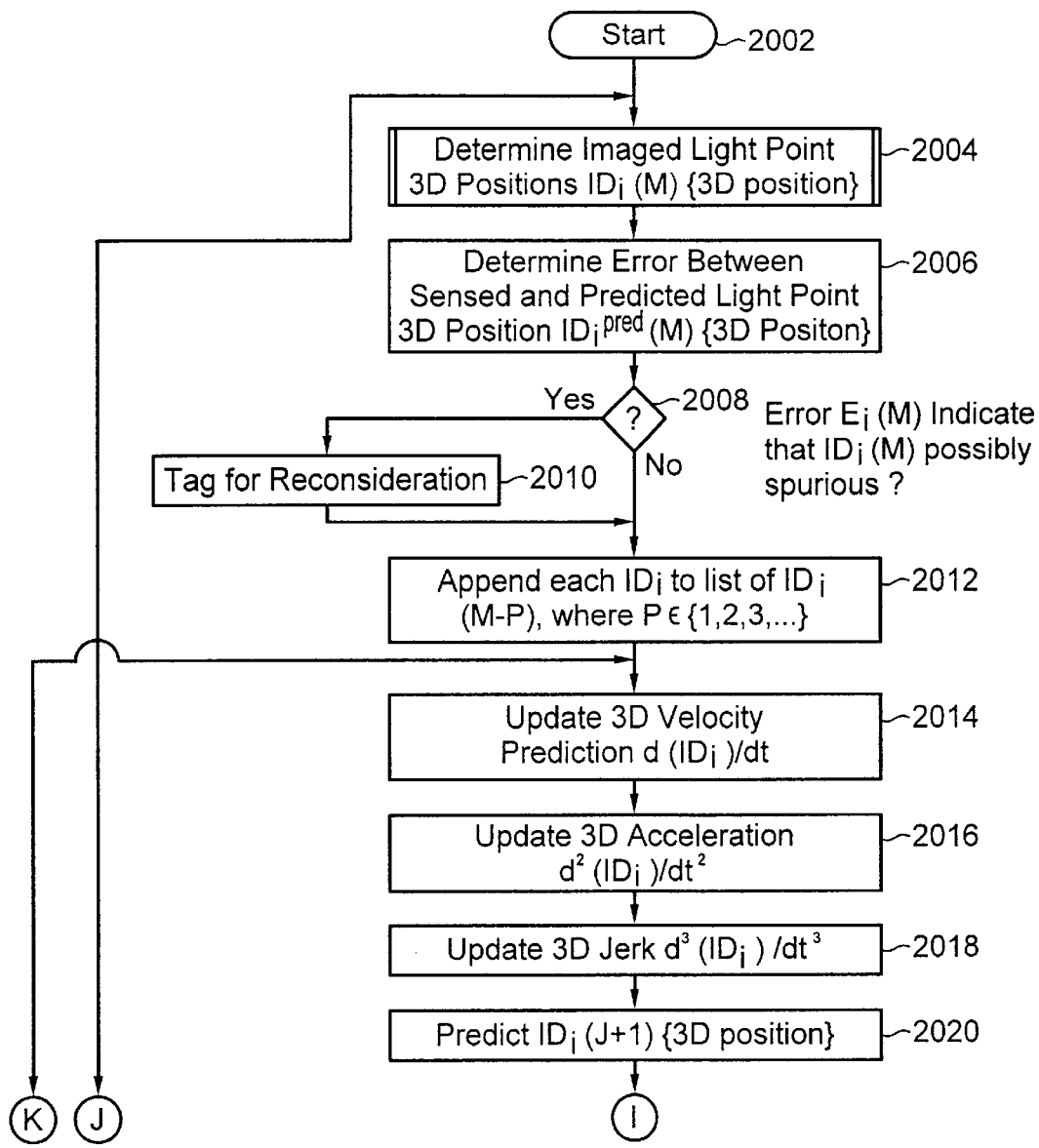
FIG. 20A and 20B depict the processing carried out to track and verify the validity of three-dimensional (3D) points according to the invention.
Figure 20B:
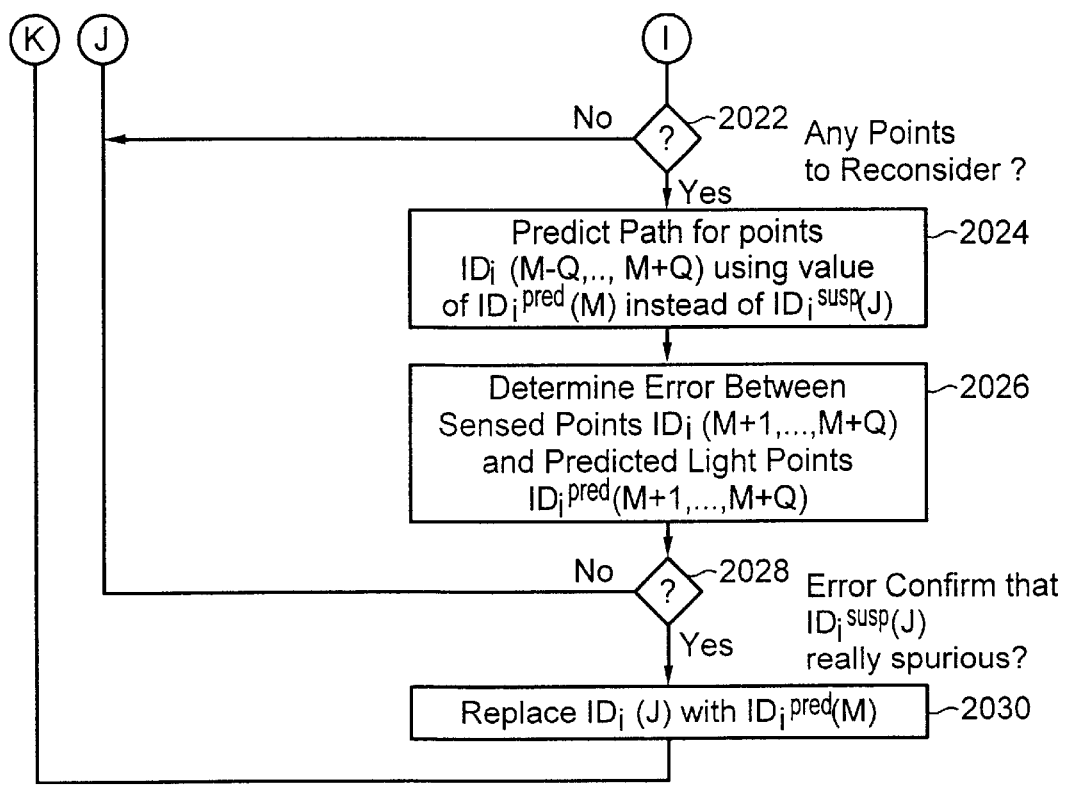

FIGS. 20A and 20B Flowcharts

FIGS. 20A and 20B depict the three-dimensional (3D) data tracking and identification performed by the controller 134. The processing of FIGS. 20A and 20B is similar to the processing of FIG. 13, except that the FIGS. 20A and 20B concern 3D data whiled FIG. 13 concern one-dimensional data.

Flow in FIG. 20A starts at step 2002, and proceeds to step 2004, where the subroutine of FIG. 18 is called to determine the 3D position of an imaged light point device. The subroutine of FIG. 18 is repeatedly called until the 3D locations of all the imaged light point devices for a given frame have been determined and stored in the RAM of the controller 134. From step 2004, flow proceeds to step 2006, where the controller 134 determines the error between the actual 3D positions determined in step 2004 and the corresponding predicted 3D positions.

Flow in FIG. 20A proceeds from step 2006 to decision step 2008, where it is determined whether the error $E_i(M)$ for any data points indicates the possibility of spurious data. For example, this determination might take the form of comparing each $E_i(M)$ to a predetermined reference value $E_{ref}(M)$. Any $E_i(M)>E_{ref}(M)$ would be considered as possibly being spurious, i.e., would be deemed suspicious. If in decision step 2008, it is deemed that there is at least one spurious 3D position, then flow proceeds to step 2010, where this data point is tagged as suspicious, e.g., $ID_i^{susp}(M)$ {3D position}. Flow proceeds from step 2010 to step 2012.

Else in decision step 2008 of FIG. 20A, if no data is deemed spurious, flow proceeds to step 2012 where each new 3D data point is appended to the list in the RAM of the controller 134 of corresponding ID data points, i.e., the history for each ID is augmented. From step 2012, flow proceeds to step 2014, where the 3D velocity of each ID is updated and stored in the RAM of the controller 134. This is accomplished in a manner very similar to the manner in which the one-dimensional velocity is updated in step 1328 of FIG. 13.

From step 2014 of FIG. 20A, flow proceeds to step 2016, where the 3D acceleration of each ID is updated and stored in the PAM of the controller 134. Again, this is accomplished in a manner very similar to the manner in which the one-dimensional acceleration is updated in step 1330 of FIG. 13.

From step 2016 of FIG. 20A, flow proceeds to step 2018, where the 3D jerk of each ID is updated and stored in the RAM of the controller 134. Again, this is accomplished in a manner very similar to the manner in which the one-dimensional jerk is updated in step 1332 of FIG. 13.

Like the one-dimensional processing of FIG. 13, additional higher order derivatives could also be determined at this point in the processing by the controller 134.

From step 2018 of FIG. 20B, flow proceeds to step 2020, where the next 3D positions of the IDs are predicted using the 3d version of the equation, $M_i^{pred}(J+1) \approx M_i(J)+M_i'(J)*T+M_i''(J)*T^2+M_i'''(J)*T^3$. From step 2020, flow proceeds to decision step 2022 of FIG. 20B, where it is determined whether there are any ID positions to reconsider, i.e., whether there are any spurious ID positions $ID_i^{susp}$ from step 2010. If decision step 2022 finds no spurious ID positions $ID_i^{susp}$, then flow proceeds back up to step 2004, i.e., it loops. If decision step 2022 finds that there is at least one spurious ID position $ID_i^{susp}$, then flow proceeds to step 2024.

In step 2024 of FIG. 20B, the controller 134 predicts a path based upon ID positions $ID_i(M-Q, \ldots, M+Q)$ using the predicted value $ID_i^{pred}(M)$ instead of the actual value $ID_i^{susp}(J)$. Flow proceeds from step 2024 to step 2026, where the controller 134 determines the error between predicted path not including the actual value $ID_i^{susp}(J)$ and the actual path including $ID_i^{susp}(J)$. From step 2026, flow proceeds to decision step 2028. where it is determined whether the error between the paths confirms that $ID_i^{susp}(J)$ really is spurious.

If in decision step 2028 of FIG. 20B it is determined that $ID_i^{susp}(J)$ is not really spurious, the spurious tag is removed and flow proceeds back to step 2004, i.e., it loops. Else, if it is determined in decision step 2028 that $ID_i^{susp}(J)$ is really spurious, then $ID_i^{susp}(J)$ is replaced with $ID_i^{pred}(J)$ and flow proceeds back to step 2014, i.e., it loops, so that the velocity, acceleration and jerk can be updated with the predicted value $ID_i^{pred}(J)$ The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A processing motion capture system comprising:
   a plurality of light point devices attached to an object to be tracked in a motion capture environment, each being operable to provide a continuous non-zero output over an interval corresponding to a plurality of pulse periods so as to define a plurality of continuous non-zero light pulses which vary in amplitude over said interval in a sequence that represents a unique plural bit digital identity (ID) of a light point device, each bit in said digital ID corresponding to an amplitude level within one of said pulse periods; said amplitude level changing at least once over said interval; and a plurality of image capture devices synchronized with said light pulses and capturing a sequence of images of said pulses substantially corresponding to said plurality of light point devices; and processing circuitry to recognize the identities of, and to track positions of, substantially all of said plurality of light point devices based upon said light pulses appearing within said sequence of images, respectively.

2. The system of claim 1, wherein said processing circuitry is operable to track positions of said plurality of light point devices simultaneously.

3. The system of claim 1, wherein said processing circuitry is distributed such that a total processing power of said processing circuitry is represented by at least a first processing stage and a second processing stage, each stage including a plurality of processing units, wherein an output of said processing circuitry is produced by said second processing stage, and said output of said second processing stage is dependent upon data generated by said first processing stage.

4. The system of claim 3, wherein said first processing stage is arranged into a first processing tier and a second processing tier, and said first processing tier has twice as many processing units as said second processing tier, and wherein said second processing tier provides said output of said second processing stage and said output of said second processing tier is dependent upon data generated by said first processing tier.

5. The system of claim 1, wherein said light pulses are modulated to represent a first logical value or a second logical value so that the digital identities are a sequence of N logical values, where N is a positive integer and $2^N$ total light point devices are identifiable, and wherein said processing circuitry is operable to synchronize said light pulses with image frames so as to recognize said digital identities by considering any set of N fields.

6. The system of claim 1, wherein said processing circuitry includes:

first imaging means for imaging light in said motion capture environment along a first reference axis and a second reference axis oriented at a first predetermined angle with respect to said first reference axis, for filtering out information not corresponding to said light point devices, and for outputting one-dimensional information that includes the ID of a light point device, a position of said light point device along said first reference axis and a position of said light point device along said second reference axis; and second imaging means for imaging light in said motion capture environment along a third reference axis and a fourth reference axis oriented at a second predetermined angle with respect to said third reference axis, for filtering out information not corresponding to said light point devices, and for outputting one-dimensional information that includes the ID of a light point device, a position of said light point device along said third reference axis and a position of said light point device along said fourth reference axis;

corresponding one-dimensional information from said first and second imaging means being sufficient to yield a three-dimensional (3D) location an a light point device.

7. The system of claim 6, further comprising:

processing means for triangulating three-dimensional positions of said light point devices based upon, for a given one of said light point devices, said one-dimensional information from one of said first and second imaging means and a portion of said one-dimensional information from the other of said first and second imaging means.

8. The system of claim 7, wherein said portion of said one-dimensional information from said other of said first and second means is an ID for one of said light point devices, and a position of said one of said light point devices along a respective one of said first or third reference axis, or along a respective one of said second or fourth reference axis, respectively.

9. The system of claim 7, wherein each of said light point devices is an originating source of light.

10. The system of claim 9, wherein each of said light point devices is a light emitting diode (LED).

11. The system of claim 10, wherein the LEDs emit infrared light.

12. The system of claim 10, wherein:

said processing means includes a transmitter for transmitting synch signals; and said motion capture system further comprises module means for receiving said synchronization signals and for modulating outputs of each of said light point devices to provide a unique sequence of light pulses representing a unique identifier (ID) for each of said light point devices according to a predetermined cycle of modulation intervals based upon said synchronization signals.

13. The system of claim 12, wherein said transmitter and module means communicate via radio frequency (RF) radiation.

14. The system of claim 6, wherein each of said first and second cameras includes:

a first cylindrical collimating and telecentric (CCT) lens system oriented perpendicularly to said first or third reference axis, respectively;

a first linear photosensor, lying along said first or third reference axis, respectively, for imaging light transferred through said first CCT lens system;

a second CCT lens system oriented perpendicularly to said second or fourth reference axis, respectively; and a second linear photosensor, lying along said second or fourth reference axis, respectively, for imaging light transferred through said second CCT lens system;

said first linear photosensor and said second linear photosensor together defining the plane segment of the camera.

15. The system of claim 14, wherein each of said CCT lens systems is formed of a cylindrical collimating (CC) sub-system superimposed on a cylindrical telecentric (CT) sub-system.

16. The system of claim 15, wherein:

said CT sub-system includes:

a planar surface having an aperture, said planar surface being oriented parallel to a plane in which lies the linear photosensor; and a first convex cylindrical lens, an optical axis of which is perpendicularly to a long axis of said linear photosensor;

said CC sub-system includes:

a concave cylindrical lens, an axis of symmetry of a concave surface of said concave cylindrical lens being parallel to said long axis of said linear photosensor; and a second convex cylindrical lens, an optical axis of which being parallel to said long axis of said linear photosensor;

a path of light through said CCT lens system passing through said aperture to said concave cylindrical lens, from said concave cylindrical lens to said first convex lens, from said first convex lens to said second convex lens, and from said second convex lens to said linear photosensor.

17. The system of claim 16, wherein:

said first convex cylindrical lens is a plano-convex cylindrical lens, a planar surface of which is oriented parallel, and is closest, to said plane in which lies the linear photosensor;

said concave cylindrical lens is a concave-plano cylindrical lens, a planar surface of which is oriented parallel, and is closest, to said plane in which lies the linear photosensor; and said second convex cylindrical lens is plano-convex cylindrical lens, a planar surface of which is oriented parallel, and is closest, to said plane in which lies the linear photosensor.

18. The system of claim 6, wherein each of said first imaging means and said second imaging means includes:

a first microprocessor for digitally processing analogs of said light imaged on a respective one of said first or third reference axis, for filtering out information not corresponding to said light point devices, and for outputting one-dimensional information including a pixel location on said one of said first and third reference axis and a corresponding amplitude of said pixel location; and a second microprocessor for digitally processing analogs of said light imaged on a respective one of said second or fourth reference axis, for filtering out information not corresponding to said light point devices, and for outputting one-dimensional information including a pixel location on said one of said second or fourth reference axis and a corresponding amplitude of said pixel location.

19. The system of claim 18, further comprising:

a third microprocessor for processing said one-dimensional information from said first microprocessor and said second microprocessor and for outputting said one-dimensional image information for each light point device in the form of a data packet including an ID, an indicator indicating the ID as being associated with one of said first or third reference axis, or one of said second or fourth second reference axis, respectively, and a location on the corresponding reference axis.

20. The system as in claim 19, wherein said first, second and third microprocessors are digital signal processors (DSPs).

21. The system of claim 18, wherein said first and second microprocessors are operable to determine a centroid for each light point device and to incorporate said centroid into said one-dimensional information output therefrom such that said one-dimensional information output therefrom has sub-pixel resolution.

22. The system of claim 18, wherein said analogs processed by said first microprocessor represent data independent of data represented by said analogs processed by said second microprocessor such that said first and second microprocessors are operable in parallel.

23. The system as in claim 18, wherein said first and second microprocessors are field programmable gate arrays (FPGAs) and said third microprocessor is a digital signal processor (DSP).

24. The system of claim 6, wherein said one-dimensional image information output by said first and second imaging means is predictions set a predetermined number, I, of frames in the future, said predictions being based upon one-dimensional information 1D_INFO of a current frame, H, namely 1D_INFO(H), such that said prediction is 1D_INFO(H+I).

25. The system of claim 24, wherein I=3.

26. The system of claim 6, wherein said first and second predetermined angles are 90°.

27. The system of claim 6, wherein information corresponding to said light imaged by said first imaging means is independent of information corresponding to light images by said second imaging means such that said first imaging means and said second imaging means are operable in parallel.

28. The motion capture system of claim 1, wherein all of said light point devices provide said continuous non-zero output, respectively, simultaneously during said interval corresponding to said plurality of pulse periods.

29. A processing motion capture system comprising:

at least one light point cluster structure attached to an object to be tracked in a motion capture environment, each light point cluster structure including at least three light point devices fixed in a predetermined configuration, each light point device being operable to provide a continuous non-zero output over an interval corresponding to a plurality of pulse periods so as to define a plurality of continuous non-zero light pulses which vary in amplitude over said interval in a sequence that represents a unique plural bit digital identity (ID) of a light point device, each bit in said digital ID corresponding to an amplitude level within one of said pulse periods, said amplitude level changing at least once over said interval;

imaging means, synchronized with said light point devices, for imaging light in said motion capture environment along a first reference axis and a second reference axis oriented at a first predetermined angle with respect to said first reference axis, for filtering out information NOT corresponding to said light point devices, and for outputting a sequence of one-dimensional images of said pulses corresponding to substantially all of said light point devices, said images representing, information that includes the ID of at least one of said light point devices, a position of at least one of said light point devices along said first reference axis and a position of at least one of said light point devices along said second reference axis; and processing means for recognizing the identities of, and for tracking positions of, substantially all of said light point devices based upon said sequence of one-dimensional images.

30. The system of claim 29, wherein said processing means is operable for triangulating three-dimensional positions of said light point devices based upon, for a given one of said light point devices, said one-dimensional information from said imaging means.

31. The system of claim 29, wherein said predetermined configuration is a triangle.

32. The system of claim 29, wherein each said light point cluster includes four light point devices and said predetermined configuration is a square.

33. The motion capture system of claim 29, wherein all of said light point devices provide said continuous non-zero output, respectively, simultaneously during said interval corresponding to said plurality of pulse periods.

34. A processing method of capturing motion of a plurality of light point devices attached to an object to be tracked in a motion capture environment, each of said light point devices being operable to provide a plurality of continuous non-zero light pulses which vary in amplitude over an interval corresponding to said plurality of light pulses in a sequence that defines a unique digital identity (ID) of a light point device, the method comprising:

a) imaging, substantially for and in synchrony with each of said plurality of light point devices, a continuous non-zero output over an interval corresponding to a plurality of pulse periods so as to define a plurality of continuous non-zero light pulses which vary in amplitude over said interval in a sequence that represents a unique plural bit digital identity in said motion capture environment along a first reference axis and a second reference axis oriented at a first predetermined angle with respect to said first reference axis, each bit in said digital ID corresponding to an amplitude level within one of said pulse periods, said amplitude level changing at least once over said interval;

b) filtering out information NOT corresponding to said light point devices;

c) outputting one-dimensional images of said pulses corresponding to substantially all of said light point devices, said images representing information that includes the ID of a light point device, a position of said light point device along said first reference axis and a position of said light point device along said second reference axis;

d) imaging, substantially for and in synchrony with each of said plurality of light point devices, a continuous non-zero output over an interval corresponding to a plurality of pulse periods so as to define a plurality of continuous non-zero light pulses which vary in amplitude over said interval in said sequence that represents a unique plural bit digital identity in said motion capture environment along a third reference axis and a fourth reference axis oriented at a second predetermined angle with respect to said third reference axis, each bit in said digital ID corresponding to an amplitude level within one of said pulse periods, said amplitude level changing at least once over said interval;

e) filtering out information NOT corresponding to said light point devices; f) outputting one-dimensional images of said pulses corresponding to substantially all of said light point devices, said images representing information that includes the ID of a light point device, a position of said light point device along said third reference axis and a position of said light point device along said fourth reference axis; and g) processing corresponding sequences of one-dimensional images from said steps c) and f) to yield IDs and three-dimensional (3D) locations of substantially all of said plurality of light point devices.

35. The method of claim 34, further comprising:
triangulating three-dimensional positions of said light point devices based upon, for a given one of said light point devices, said one-dimensional information from one of said steps c) and f) and a portion of said one-dimensional information from the other of said steps c) and f).

36. The method of claim 35, wherein said portion of said one-dimensional information from said other of said steps c) and f) is an ID for one of said light point devices, and a position of said one of said light point devices along a respective one of said first or third reference axis, or along a respective one of said second or fourth reference axis, respectively.

37. The method of claim 36, wherein information corresponding to said light imaged by said step a) is independent of information corresponding to light imaged by said step d) such that said steps b) and c) are processed in parallel to said steps e) and f).

38. The method of claim 34, wherein each of said steps c) and f) include:

g) outputting one-dimensional information including a pixel location on a respective one of said first and third reference axis and a corresponding amplitude of said pixel location; and h) outputting one-dimensional information including a pixel location on a respective one of said second or fourth reference axis and a corresponding amplitude of said pixel location.

39. The method of claim 38, further comprising:

i) processing said one-dimensional information from said steps g) and h) to output said one-dimensional image information for each light point device in the form of a data packet including an ID, an indicator indicating the ID as being associated with one of said first or third reference axis, or one of said second or fourth second reference axis, respectively, and a location on the corresponding reference axis.

40. The method of claim 34, wherein said one-dimensional image information output by said steps c) and f) is a predictions set of a predetermined number, I, of frames in the future, said predictions being based upon one-dimensional information 1D_INFO of a current frame, H, namely 1D_INFO(H), such that said prediction is 1D_INFO(H+I).

41. The method of claim 40, wherein I=3.

42. The method of claim 34, wherein analogs imaged by said step a) represent data independent of data represented by analogs imaged by said step d) such that said steps b) and c) are operable in parallel.

43. The method of claim 34, further comprising:
transmitting synch signals; and
receiving said synchronization signals; and
modulating outputs of each of said light point devices to provide a unique sequence of light pulses representing a unique identifier (ID) for each of said light point devices according to a predetermined cycle of modulation intervals based upon said synchronization signals.

44. The method of claim 34, wherein said light pulses are modulated to represent a first logical value or a second logical value so that the digital identities are a sequence of N logical values, where N is a positive integer and $2^N$ total light point devices are identifiable, and wherein imaged frames are synchronized with said light pulses to recognize said digital identities by considering any set of N fields.

45. The method of claim 34, wherein all of said light point devices provide said continuous non-zero output, respectively, simultaneously during said interval corresponding to said plurality of pulse periods.

46. A motion capture method comprising:
imaging a plurality of light point devices attached to an object to be tracked in a motion capture environment, each being operable to provide a continuous non-zero output over an interval corresponding to a plurality of pulse periods so as to define a plurality of continuous non-zero light pulses which vary in terms of an optical characteristic over said interval in a sequence that represents a unique plural bit digital identity (ID) of a light point device, each bit in said digital ID corresponding to a state of said optical characteristic within one of said pulse periods, said state of said optical characteristic changing at least once over said interval;

capturing a sequence of images of said pulses corresponding to substantially all of said plurality of light point devices; and recognizing the identities of, and tracking the positions of, substantially all of said plurality of light point devices based upon said light pulses appearing within said sequence of images, respectively.

47. The method of claim 46, wherein all of said light point devices provide said continuous non-zero output, respectively, simultaneously during said interval corresponding to said plurality of pulse periods.

48. A motion capture system comprising:

a plurality of light point devices attached to an object to be tracked in a motion capture environment, each being operable to provide a continuous non-zero output over an interval corresponding to a plurality of pulse periods so as to define a plurality of continuous non-zero light pulses which vary in terms of an optical characteristic over said interval in a sequence that represents a unique plural bit digital identity (ID) of a light point device, each bit in said digital ID corresponding to a state of said optical characteristic within one of said pulse periods, said state of said optical characteristic changing at least once over said interval;

means for capturing a sequence of images of said pulses corresponding substantially to all of said plurality of light point devices; and processing circuitry to recognize the identities of, and to track positions of, substantially all of said plurality of light point devices based upon said light pulses appearing within said sequence of images, respectively.

49. The system of claim 48, wherein said variable optical characteristic is pulse amplitude.

50. The motion capture system of claim 48, wherein all of said light point devices provide said continuous non-zero output, respectively, simultaneously during said interval corresponding to said plurality of pulse periods.

* * * * *